United States Patent
Leason et al.

(10) Patent No.: US 8,140,385 B2
(45) Date of Patent: Mar. 20, 2012

(54) PROMOTIONAL CAMPAIGN AWARD VALIDATION METHODS THROUGH A DISTRIBUTED COMPUTER NETWORK

(75) Inventors: David Leason, Chappaqua, NY (US); Scott L. Sullivan, Chappaqua, NY (US)

(73) Assignee: Taheen Foundation LLC, Wilmington, DE (US)

( * ) Notice: Subject to any disclaimer, the term of this patent is extended or adjusted under 35 U.S.C. 154(b) by 1478 days.

(21) Appl. No.: 11/513,324

(22) Filed: Aug. 31, 2006

(65) Prior Publication Data

US 2007/0043619 A1 Feb. 22, 2007

Related U.S. Application Data

(60) Division of application No. 10/738,067, filed on Dec. 16, 2003, now Pat. No. 7,865,393, which is a continuation of application No. 10/030,514, filed as application No. PCT/US00/11094 on Apr. 21, 2000, now Pat. No. 6,663,105, which is a continuation-in-part of application No. 09/295,943, filed on Apr. 21, 1999, now Pat. No. 6,251,017.

(60) Provisional application No. 60/154,346, filed on Sep. 17, 1999.

(51) Int. Cl.
G06Q 30/00 (2006.01)
A63F 13/00 (2006.01)
A63F 1/00 (2006.01)

(52) U.S. Cl. ........... 705/14.14; 463/17; 463/29; 463/42; 273/138.1; 273/138.2

(58) Field of Classification Search ............... 705/14.14; 463/17, 29, 42; 273/138.1, 138.2
See application file for complete search history.

(56) References Cited

U.S. PATENT DOCUMENTS

| | | | |
|---|---|---|---|
| 5,069,453 A | 12/1991 | Koza et al. |
| 5,373,440 A | 12/1994 | Cohen et al. |
| 5,749,075 A | 5/1998 | Toader et al. |
| 5,772,510 A | 6/1998 | Roberts |
| 5,791,990 A | 8/1998 | Schroeder et al. |
| 5,791,991 A | 8/1998 | Small |
| 5,806,043 A | 9/1998 | Toader |
| 5,816,918 A | 10/1998 | Kelley et al. |

(Continued)

OTHER PUBLICATIONS

"Liechtenstein", Novamedia Gaming & Lottery Files, downloaded Jul. 23, 2011 from http://www.gamingandlotteryfiles.com/novamediafile.php?file=Liechtenstein.htm.*

(Continued)

*Primary Examiner* — Donald L. Champagne
(74) *Attorney, Agent, or Firm* — Sterne, Kessler, Goldstein & Fox P.L.L.C.

(57) ABSTRACT

Code processing for promotional games and the like. In a preferred application, a lottery ticket holder who has purchased a lottery ticket is encouraged to access a designated Internet site by rewarding access thereat on the condition that information visibly supported on the lottery ticket from a given drawing is input at an Internet site and a test indicates that the information so-input matches lottery numbers that were picked for that drawing. Access to predetermined Internet-based services or sites can also be had as an award to an individual for inputting an iconic code at a machine connected to the Internet if the input code tests as valid, with the code being marked so as to be usable only once. Preferably, the iconic code is input by click-selecting displayed icons one after another in an order that corresponds to that of a code provided to the individual. POS methods for code processing are also described.

28 Claims, 24 Drawing Sheets

U.S. PATENT DOCUMENTS

| | | | |
|---|---|---|---|
| 5,851,149 | A | 12/1998 | Xidos et al. |
| 5,883,620 | A | 3/1999 | Hobbs et al. |
| 5,892,827 | A | 4/1999 | Beach et al. |
| 5,907,830 | A | 5/1999 | Engel et al. |
| 5,924,078 | A | 7/1999 | Naftzger |
| 6,009,411 | A | 12/1999 | Kepecs |
| 6,049,778 | A * | 4/2000 | Walker et al. .............. 705/14.14 |
| 6,061,660 | A | 5/2000 | Eggleston et al. |
| 6,173,267 | B1 | 1/2001 | Cairns |
| 6,267,672 | B1 | 7/2001 | Vance |
| 6,640,213 | B1 * | 10/2003 | Carp et al. ................... 705/7.32 |
| 6,663,105 | B1 * | 12/2003 | Sullivan et al. ............ 273/138.2 |
| 6,736,324 | B2 | 5/2004 | Behm et al. |
| 6,754,636 | B1 | 6/2004 | Walker et al. |
| 6,920,431 | B2 | 7/2005 | Showghi et al. |
| 2004/0133472 | A1 | 7/2004 | Leason et al. |

OTHER PUBLICATIONS

Prizelink_WaybackMachine_19980101, sequence of four web pages from "prizelink.com" archived Jan. 19, 1998 at WaybackMachine.com, downloaded Nov. 27, 2011.*

Silicon Alley Reporter, "Where's the Beenz?," Issue 26, p. 78 plus magazine cover (vol. 3, No. 6, 1999).

Label from bottle of Powerade® brand bottle label, front and back (2 sheets).

Powerade.com/dinfo.html, "Download Screen Saver" installation and configuration instructions (1 sheet).

Powerade.com, Web pages from active window, including: "Are You Ready To Play," "The Play" with "show play" button, "The Play" with "show prize" button, "You Have Entered a Winning PIN Number." "Keep Playing Skill Challenge Contest," and "Keep Playing Skill Challenge Contest: First Steps" (each a screen print on 2 sheets; total 10 sheets).

Mypoints.com, Web pages including: "About MyPoints," "All About Earning with MyPoints," "All About Spending with MyPoints," "All About BonusMail®," "Our Technology," and "Our Partners" (all printed on Aug. 12, 1999; total of 8 sheets).

Powerade.com, "Welcome to POWERaDE.COM" Web page in active window (screen print on 2 sheets, printed Jul. 20, 1999).

Powerade.com, "Enter your reference number please" Web page in active window (screen print on 2 sheets, printed Jul. 20, 1999).

Powerade.com/igrules.html, "Powerade Keep Playing Challenge" Official Rules (3 sheets, printed Jul. 20, 1999).

Catalinamktg.com/manufacture/frm_main_instant.html, "In-Store Instant-Win Games" Web page (1 sheet, printed Jul. 12, 1999).

Cherry Coke label from two-liter bottle purchased May 1999 (1 sheet).

Mtv.com/mtv/marketing/cherry_coke2/Web page (1 sheet, printed May 26, 1999).

Mtv.com/mtv/marketing/cherry_coke2/gameplay.html Web page (1 sheet, printed May 26, 1999).

Cherrycoke.com Web page (1 sheet, printed May 26, 1999).

Cherrycoke.com/welcome.html Web page (1 sheet, printed May 26, 1999).

Cherrycoke.com/1-create.html Web page (1 sheet, printed May 26, 1999).

Sevenup.com/html/promounder.html Web page (1 sheet, printed May 26, 1999).

Realmemedia.com/services/index.html "Promotional Services" Web page (2 sheets, printed Jun. 21, 1999).

Prizelink.com/who.html "We've Moved" Web page (2 sheets, printed Jun. 21, 1999).

Prizelink.com/prizelinkinfo.html "Who We Are" Web page (1 sheet, printed Jun. 21, 1999).

Prizelink.com/easymoney2/home.html "Easy Money!" Web page (1 sheet, printed Jun. 21, 1999).

Prizelink.com/easymoney2/works.html "How It Works" Web page (2 sheets (2nd blank), printed Jun. 21, 1999).

Prizelink.com/easymoney2/participate.html "How To Participate" Web page (1 sheet, printed Jun. 21, 1999).

Prizelink.com/easymoney2/program.html "Program" Web page (2 sheets, printed Jun. 21, 1999).

Content.ubl.com/store/specials/scratcher/scratcher_rules.html Web page (4 sheets, printed May 26, 1999).

Bestbuy game piece including coupon with code entered at gomobile.bestbuy.com Web site (1 sheet; obtained by fax on May 14, 2001).

Travel Channel "Million Miles A Week Giveaway" campaign, selected Web pages including code entry form, rules and frequently asked questions (6 sheets; printed Oct. 19, 1999).

BBC News: "Eat Yourself A Win (Chocolate bars are going interactive . . . )" (3 sheets; May 31, 2001).

The New York Times: "With A Stone-Mate, The Puzzles Begin" (1 sheet; Oct. 21, 1999 (page unknown)).

Coaster (coupon) from Café Expresso at Borders redeemable at borders.com/coaster.

"1/Pro Launches 1/Code Promotion to Reward Internet Users", PR Newswire, Feb. 27, 1996.

"Definition of 'code'" (n), Merriam-Webster's Collegiate Dictionary, 10th ed. (Springfield MA: Merriam Webster), 1997.

"Definition of 'through'", Merriam-Webster's Collegiate Dictionary accessed at http://www.search.eb.com/dictionary, Oct. 16, 2005.

BusinessWeek 1998, article entitled ""A Little Net Privacy, Please"", downloaded from http://www.businessweek.com/1998/111b3569104.him, Oct. 16, 2005.

Wellman David, "Click 'N' Save", Supermarket Business. v. 54. n. 4, p. 19(1 ), Apr. 1999.

"Definitions of 'system' and 'component'", Microsoft Press Computer Dictionary, 3rd, Ed., (Redmond, Washington: Microsoft Press, 1997).

* cited by examiner

PROMOTIONAL CAMPAIGN AWARD VALIDATION METHODS THROUGH A DISTRIBUTED COMPUTER NETWORK

CROSS REFERENCE TO RELATED APPLICATIONS

This patent application is a divisional application of U.S. patent application Ser. No. 10/738,067, filed Dec. 16, 2004, which is a continuation of U.S. patent application Ser. No. 10/030,514, filed Oct. 19, 2001, now U.S. Pat. No. 6,663,105, issued Dec. 16, 2003, which is a U.S. national phase of PCT/US00/11094, filed Apr. 21, 2000, which is a continuation-in-part of U.S. patent application Ser. No. 09/295,943, filed Apr. 21, 1999, now U.S. Pat. No. 6,251,017, and this patent application also claims priority from U.S. Provisional Application Ser. No. 60/154,346, filed Sep. 17, 1999; each of the aforesaid applications is entitled "Game Or Lottery With A Reward Validated And/Or Redeemed Online," and each is hereby incorporated by reference in its respective entirety.

BACKGROUND OF THE INVENTION

1. Field of the Invention

The present invention relates to games of the type used in promotional campaigns or lotteries. The inventive method distributes game cards or receipts with codes to players, with the codes being validated and/or redeemed online.

2. Background Art

One form of promotional campaign that has been used to attract customers to stores revolves around the use of game pieces. Fast food chain stores in particular have distributed game pieces to their customers, with the goal of increasing sales by attracting more or repeat customers. The game pieces sometimes provide an instant reward and may include a portion that is combined with other game pieces to redeem a different award.

In one game, a perforated cover conceals a hidden reward. To play the game, the player removes the cover to reveal the reward. In another game, a scratch-off cover conceals a selection of potential rewards and the player exposes a selected reward by scratching-off the cover with a coin, fingernail, etc. These games have been used by a variety of retail stores and especially fast food chain stores. State lotteries have also used such games.

In conventional game-piece campaigns and lotteries, the action of the game is confined to the real-world (a.k.a. "dirtworld"), with the rewards comprising free food, prizes, or discounts. In the case of fast-food chain stores, the reward is typically a food item, for example, french fries or a hamburger. Such prizes are furnished by the franchisee, who may or may not be reimbursed by the game-sponsoring franchisor or corporation. If the franchisees are to be reimbursed, the game pieces must be collected from each franchisee, forwarded to a processing center, cleared, and a credit allocated to each respective franchisee. The small game pieces can be difficult to handle and processing the awarded prizes is costly.

At least one Burger King© restaurant franchisee has provided customers with access to the internet through computer terminals connected in his restaurant. As reported in The New York Times, customers receive a personal identification number (PIN) which entitles them to twenty minutes of internet access when they make a minimum purchase at the restaurant. Gambling and sex-oriented sites are blocked. The internet access provided to such customers is no greater than that of any other person who connects to the internet and the customer is not guided to any particular internet site. Further, the customer does not earn points or credits which permit access to sites or services which are otherwise restricted to members, subscribers, or viewers who pay a fee to access such sites or services.

There exists a need for an improved game in which rewards are enjoyed in the virtual world, such as at an internet site. Also needed is an improved game which provides secure distribution and redemption of game pieces and/or incentives to return to the source of the game without the customer having to identify himself. Further, franchisee's are in need of an improved game to promote sales and customer interest wherein the rewards are disseminated by the franchisor. Moreover, store owners and franchisees alike are in need of an improved method to stimulate interest in their web sites and to encourage customers from the web site to their stores. The present invention satisfies these and other needs.

BRIEF SUMMARY OF THE INVENTION

Various aspects of the invention are described in the aforementioned patent documents which have been incorporated by reference.

In a further aspect, a method for providing awards in the form of access to one or more predetermined Internet-based services or sites for which access is otherwise restricted comprises the steps of: providing a code to an individual at a store, the code comprising a set of icons; presenting icons on a display of a machine connected to an Internet site to the individual icons including at least each icon in the set of icons; click-selecting one presented icon after another in an order that corresponds to that of the provided code, so as to input the code to the Internet site; testing the input code to see if it is valid; providing access to at least one of said predetermined Internet-based services or sites in response to inputting a valid code; and marking the code in response to the providing step. As a result of this method, the code is useable only once to provide access to said predetermined Internet-based services or sites.

In yet a further aspect, a method for encouraging a lottery ticket holder to access a designated Internet site, comprises the steps of: inputting at an Internet site information visibly supported on the purchased lottery ticket from a given drawing to register the lottery ticket holder; testing the information to determine if it matches lottery numbers that were picked for that drawing; and providing the lottery ticket holder with access to the designated Internet site on the condition that the test indicates that the information visibly supported on the lottery ticket satisfied the test.

In still a further aspect, a method for processing a validation code received at a point of sale (POS) machine during a purchase transaction, comprises the steps of: registering the validation code through the Internet site; receiving the validation code from the customer at the POS machine; testing whether the validation code has been registered through the Internet site; in the event that the test is satisfied, generating a discount signal which awards the customer a discount; and discounting the purchase transaction in the amount of the awarded discount.

Several arrangements and embodiments are disclosed herein of the invention; the features and advantages of one arrangement or embodiment disclosed herein can be applied to other arrangements or embodiments of the invention.

These and other features and aspects of the invention can be appreciated from the drawing Figures and Detailed Description.

BRIEF DESCRIPTION OF THE DRAWINGS/FIGURES

DETAILED DESCRIPTION OF THE INVENTION

By way of overview and introduction, the present invention is described in connection with several arrangements in which validation codes are distributed to players for validation at a designated internet site. A number of e-points may be awarded to the player when the validation code is registered at the designated internet site. In other games, a prerequisite to receiving a benefit at another internet site or a dirt-world store is that the validation code be registered online. As described below, players validate their e-point awards or register their validation codes by entering the code into a machine at their homes, offices, or some other location—typically outside of the store at which the game card or receipt was received. E-point validation preferably occurs at the time of e-point redemption.

The term "e-point" as used in this patent specification refers to a measure of an amount of a benefit which is spent like money or elapses like time in response to usage of a designated internet service or site. The greater the number of e-points, the greater the benefit conferred upon the player.

In a game or lottery in which pre-printed game cards are used, the award of e-points from a given game card may be predetermined for each card. Alternatively, the number of e-points associated with a pre-printed game card can be dynamically determined at the time of award redemption. The same is true when the game card is a receipt from a purchase transaction. On the other hand, an award of e-points can be determined based upon details from a purchase transaction of a customer. As an embellishment upon any of these arrangements, the game card or receipt can be tendered at a store and will confer a benefit on the holder if it was validated online, regardless of whether e-points were awarded. In other forms, "e-points" are distributed to players from a display connected to an interactive machine such as the machine 304 described below. These game arrangements are discussed below.

1. Pre-Printed Game Cards with a Predetermined Number of E-Points

Figure 1:
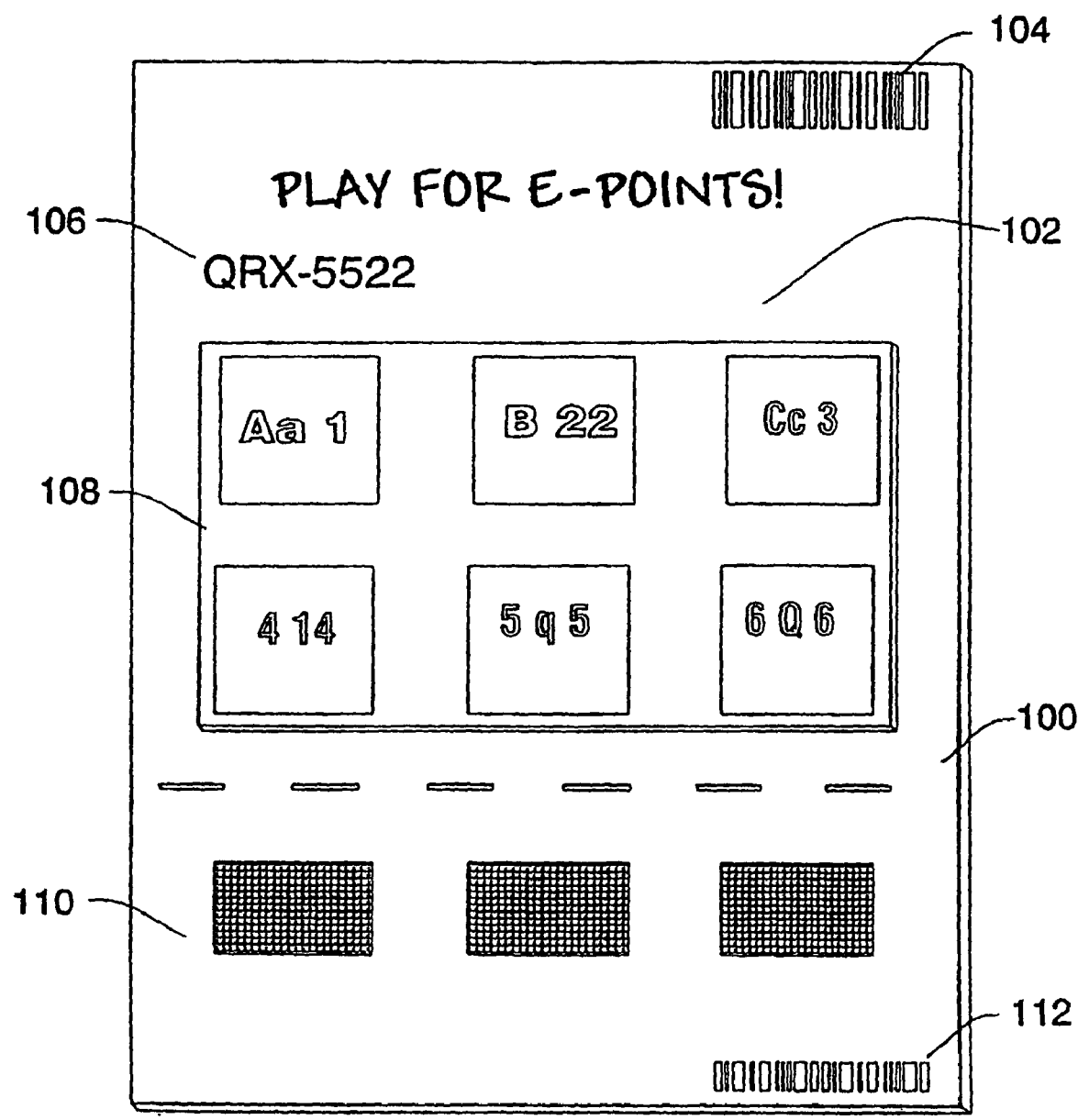
FIG. 1 illustrates a game card supporting a validation code consisting of two alphanumeric portions that may be used in the present invention.
Figure 2:
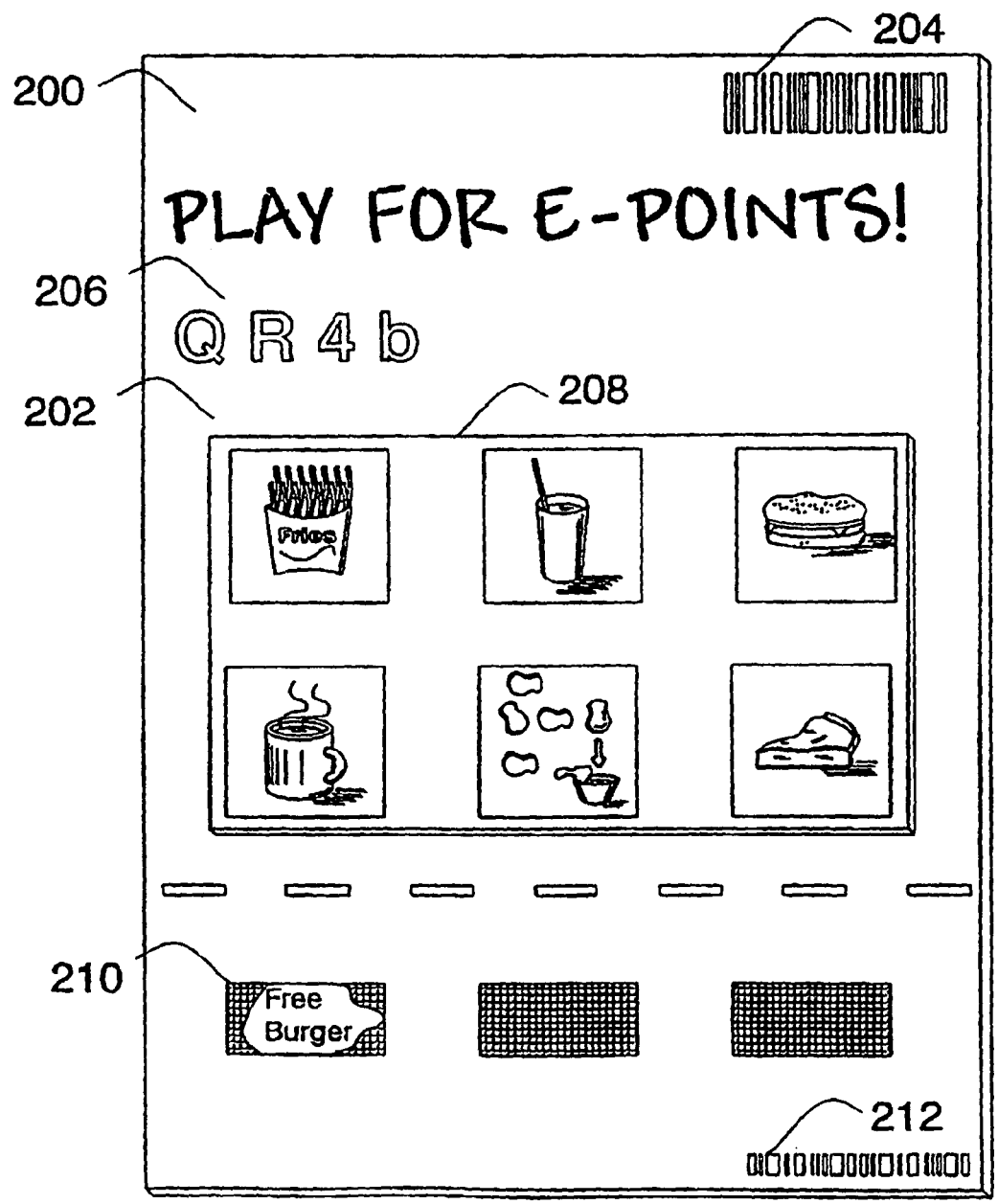
FIG. 2 is a variation of the game card of FIG. 1, in which the validation code includes an alphanumeric portion and one of a series of icons.

In FIGS. 1 and 2, two variations of a game card are illustrated. A series of game cards such as the type shown in either FIG. 1 or 2 together comprise a particular game which may include 600 million or more game cards. The game cards are to be distributed to a great number of players across a particular state or the entire United States, and, in contrast to prior games, the reward on these game cards is redeemed outside of the store and without manual intervention of a store clerk. When the reward is in the form of limited access to an internet service or site, there is no paper processing required to redeem and provide the reward to the player, and there is no need to reimburse a franchisee or store for distributing a winning game card.

The pre-printed game cards 100, 200 of FIGS. 1 and 2 support a visible validation code 102, 202 which identifies each card in the series. In addition, the game cards may further include a machine-readable code 104, 204 (e.g., a bar code and/or magnetic ink) for control, tracking, or in-store award purposes. The validation code preferably comprises a master-code 106, 206 and a set of associated sub-codes 108, 208.

The exemplary game cards 100, 200 further include a conventional scratch-off type instant award attached to a perforated portion 110, 210 of the game card. The perforated portion includes several concealed choices, one or more of which can provide the player with an instantly redeemable reward which is revealed by removing a scratch cover. The game card 200, for example, includes a "free burger" award, as shown where the scratch cover has been removed. A machine-readable code 112, 212 also is provided on the perforated portion 110, 210 for tracking and clearing the instant reward. Thus, if the perforated portion is separated from the remainder of the card, for example, to redeem the instant award, the nature and value of the award as well as the card from which the award was granted can be traced by the franchisee, franchisor or other processing center. The machine-readable code 112, 212 further may be usable to identify the store to which that game card was initially distributed. The perforation and instant award are optional features.

Figure 3:
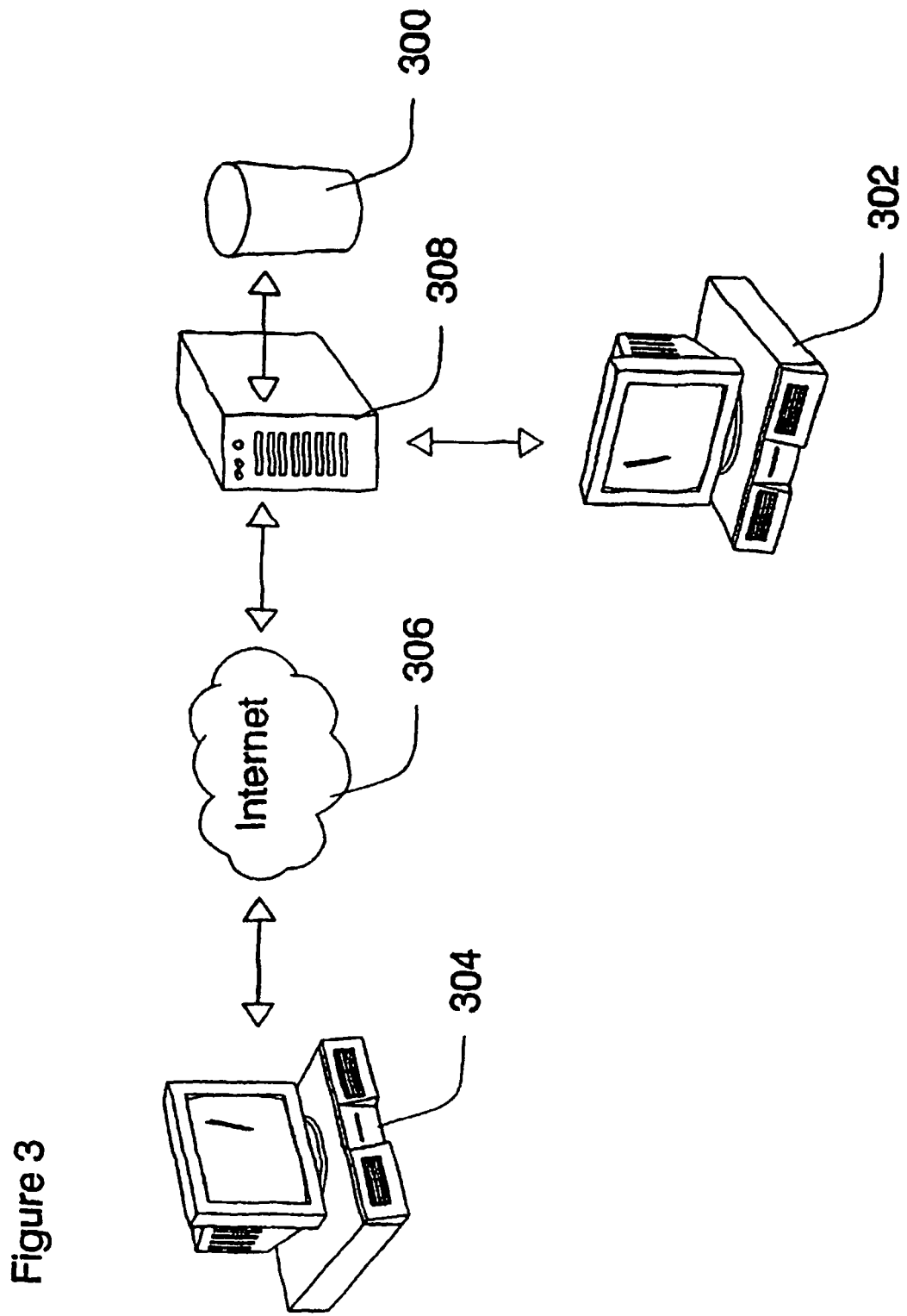
FIG. 3 illustrates a hardware arrangement by which a player can validate and/or redeem a reward online.

In accordance with one arrangement of the invention and as shown in FIG. 3, a relationship table is established and stored in a database 300 which associates the validation code of each game card in the series with a predetermined number of e-points. The relationship table is established prior to distributing the game cards in a given series. The relationship table can be established in a variety of ways, and is preferably established using a programmed computer. As an illustration, the computer generates a multiplicity of unique validation codes, each of which is included in a separate row of the relationship table. This may be done, for example, by cycling through the various permutations and either randomly selecting from among the permutations the validation codes to be included as a row in the relationship table, or deselecting certain permutations and including the remainder as rows in the relationship table until the number of validation codes and rows in the relationship table equals or exceeds the number of game cards to be included in the series. Thereafter, the number of each type of award is set and assigned to selected validation codes. For example, the award may be randomly assigned to a validation code or, equivalently, assigned to a row in the relationship table. That row of the relationship table and that validation code need not be considered further (e.g., a flag may be set that the validation code has been assigned a number of e-points, or the presence of data in the e-point field can be tested). In this manner, each of the validation codes is assigned an e-point award until there are no more e-point awards to give out. At that time, any unassigned validation code may be accorded an arbitrary award of e-points (e.g., zero). In the event that master-codes and sub-codes are used, the award assignment can be made on a game-card by game-card basis to ensure that each card has a designated pattern of awards (e.g., one great award, one zero award, and the remainder moderate to small awards). Techniques known in the lottery industry also can be applied to establish a set of game cards with an appropriate distribution of awards.

The actual number of e-points awarded for a given game card need not be printed or shown on the game card. Rather, the player can discover the magnitude of the reward by contacting a host system 302 which manages the database 300. The player contacts the host system using a machine 304 such as a personal computer and a modem or other device which enables bidirectional communication between the host system 302 and the machine 304. The connection is preferably made over a public network, and most preferably over the internet 306. The host system 302 includes a server 308 which manages redemption requests from a multiplicity of players, each connecting to the system using machines 304. The hardware is conventional and forms no part of the present invention. The player preferably uses any one of a number of standard web browsers such as the Internet Explorer°, a product of Microsoft Corporation, Redmond, Wash., and the server is preferably compliant with a variety of web browsers.

Figure 4:
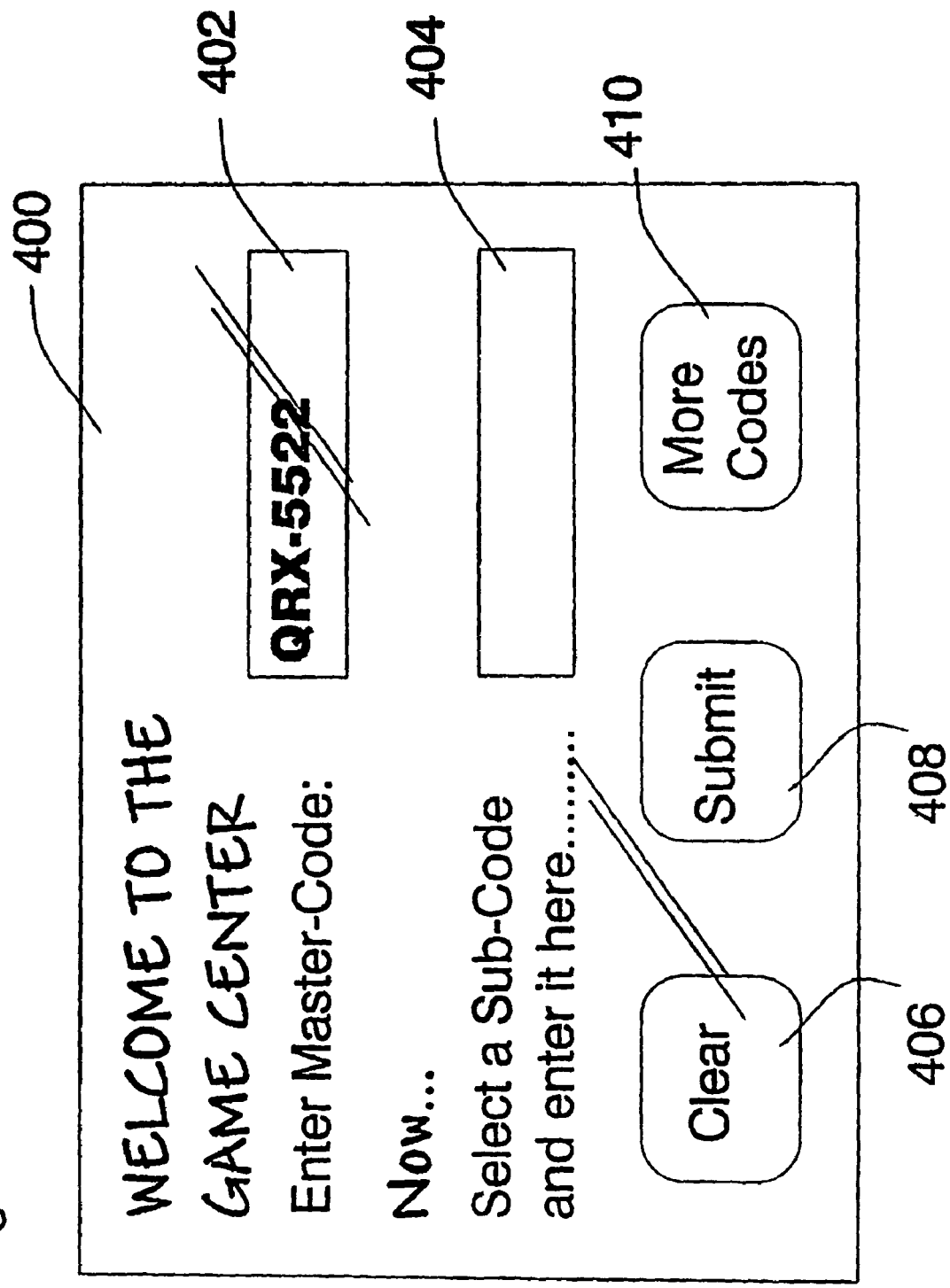
FIG. 4 illustrates a redemption form, partially filled in by a player, for submitting a validation code.

As shown in FIG. 4, a redemption form within a page 400 is provided by the hosting web site and permits the player to enter the validation code into the machine 304 after connecting to the host system 302. The form includes fields suitable for entering the validation code, such as master-code field 402 and sub-code field 404, and buttons which permit the form to be cleared (button 406) or submitted (button 408) and which permit the player to enter additional validation codes from any other game cards he or she may have (using the more-codes button 410). In particular, the more-codes button 410 permits the player to aggregate e-point awards to increase the magnitude of the reward that he or she can use. Of course, the more codes button can be provided on a different page, for example, a page or frame which is displayed after submitting the validation code from a particular game card. Upon submitting the codes, a further page may be displayed from which the player can select from a list of predetermined or designated internet sites and services to access and use in exchange for some or all of the awarded e-points.

The validation code contained on each game card 100, 200 preferably comprises a master-code 106 and a set of sub-codes 108. The validation code displayed on each game card is stored in the relationship table within a machine, for example, within memory or the storage device 300 of the server 308. By entering the master-code 106 from a game card and a selected one of the sub-codes 108 into the redemption form 400 at the computer 304 (a first machine), a complete validation code is provided which can reference a predetermined e-point award through the relationship table. In other words, the relationship table associates a predetermined number of e-points with each of the sub-codes 108 such that a selection by the player of a particular sub-code 108, in combination with the master-code, determines the reward.

In Relationship Table A below, the master-code and sub-codes for two game cards are shown. In particular, game card 100 of FIG. 1 is the first game card in the Relationship Table A. The game card 100 has one master code 106 which is associated with a set of six sub-codes 108. A single game card 100 provides the player with a selection of six choices from which one combination master-code 106 and sub-code 108 can be entered in an attempt to win a reward. The redemption form 400 of FIG. 4 has the master-code field 402 completed with the master-code 106 from the game card 100. The player now can select one of the sub-codes 108 to enter into the sub-code field 404 to register the validation code and obtain the a-point reward. Of course, fewer or more sub-codes 108 can be associated with each master-code 106 to decrease or increase the number of choices provided to the player from a single game card.

RELATIONSHIP TABLE A

| Card No. | Master-Code | Sub-Code | e-Points | Card Void? | Store No. |
|---|---|---|---|---|---|
| 100 | QRX-5522 | Aa1 | 5 | N | 3400 |
| 100 | QRX-5522 | B22 | 10 | N | 3400 |
| 100 | QRX-5522 | Cc3 | 15 | N | 3400 |
| 100 | QRX-5522 | 414 | 5 | N | 3400 |
| 100 | QRX-5522 | 5q5 | 5 | N | 3400 |
| 100 | QRX-5522 | 6Q6 | 0 | N | 3400 |
| 101 | AbD-qqR4 | french fries | 5 | Y | 3401 |
| 101 | AbD-qqR4 | shake | 5 | Y | 3401 |
| 101 | AbD-qqR4 | burger | 5 | Y | 3401 |
| 101 | AbD-qqR4 | coffee | 120 | Y | 3401 |
| 101 | AbD-qqR4 | chicken dips | 30 | Y | 3401 |
| 101 | AbD-qqR4 | apple pie | 0 | Y | 3401 |

Relationship Table A further illustrates that different predetermined numbers of e-points can be earned from a given game card, depending on which sub-code is selected. For example, the game card 100 has six sub-codes 108 which reward the player between 0 and 15 e-points, depending on which sub-code is entered into the sub-code field 404 of the redemption form 400. The game card 101 awards between 0 and 120 e-points, again depending on which sub-code is entered into the redemption form. Because the number of e-points to be awarded varies from sub-code-to-sub-code and from game-card-to-game-card, there is an element of surprise which subsists until the player enters these codes at the computer station.

The method according to this arrangement of the invention is now described with reference to the process flow of FIG. 5. At step 500, a relationship table such as the Relationship Table A above is established which correlates an e-point award with a multiplicity of master-codes and their associated sets of sub-codes. The contents of the relationship table are stored in the database 300. The game cards are distributed to players at step 520 in any conventional manner, for example, at a point of sale terminal in a retail store, in a newspaper, by mail, or in a page, frame or banner displayed at an internet site. The players attempt to redeem a reward by entering the master-code and a selected one of the set of sub-codes which appear on the same game card. The master-code and the selected sub-code are received at step 530 at the machine 304 by entering that information into the redemption form 400 and posting it. At step 540, the validation codes received from the posted redemption form are compared against the data in the relationship table to determine if the input master-code and the selected sub-code are included in the database 300. If they are, then the validation code entered by the player appears on a game card in the series and the player is presumed to possess an actual game card. Thus, the comparison at step 540 better ensures that the player possesses the game card having the received codes and reduces the risk of fraudulent redemption. In the event that the entered master-code is not associated with the selected sub-code in the relationship table, then at step 550 the player is requested to re-enter the master-code and sub-code using the redemption form 400. The user may be permitted only a limited number of attempts (e.g., three) to enter the correct codes to minimize and inhibit code hacking.

If the master-code and the selected sub-code entered into the redemption form 400 are associated with one another in the database 300, then at step 560 a check is made to determine whether the game card has already been used. Preferably, a game card can only be used once and then it is exhausted or void. To "use" the game card and exhaust it, a player must enter a master-code and a corresponding sub-code that are associated in the relationship table. Thus, when a player enters the correct codes and the card is not void, he or she will be awarded at step 570 the predetermined number of e-points associated with the entered codes. Entry of the incorrect code directs the process flow to step 550 for code re-entry and the game card is not voided.

As shown in the relationship table above, a predetermined number of e-points is associated with each sub-code as a row entry in the table. The e-point award, if any, is in the amount specified in the row entry of the relationship table that includes the entered master-code and sub-code. A simple search algorithm using the master-code as the search criterion identifies which game card the player possesses and another search using the sub-code as the criterion identifies which e-point award is to be rewarded to the player.

After awarding the e-points, the master-code and preferably (but optionally) each of the sub-codes associated with that master-code are flagged as void, at step 580. The player is then invited at step 590 to spend the awarded e-points at a designated internet service or site (by pressing the submit button 408), or can enter additional validation codes back at step 530 (by pressing the more-codes button 410). Because the master-code has been marked as void, if it is subsequently entered at step 530, it will still satisfy the validity test at step 540 (because the codes are valid ones), but will fail the "card void?" test at step 560. Upon failing the "card void" test, the system provides the player with one or more chances to enter correct and non-void validation codes. No reward is provided if the game-card is void. The order of these steps can be varied somewhat as understood by those of skill in the art (for example, steps 570 and 580 can be performed in reverse order).

Figure 6:
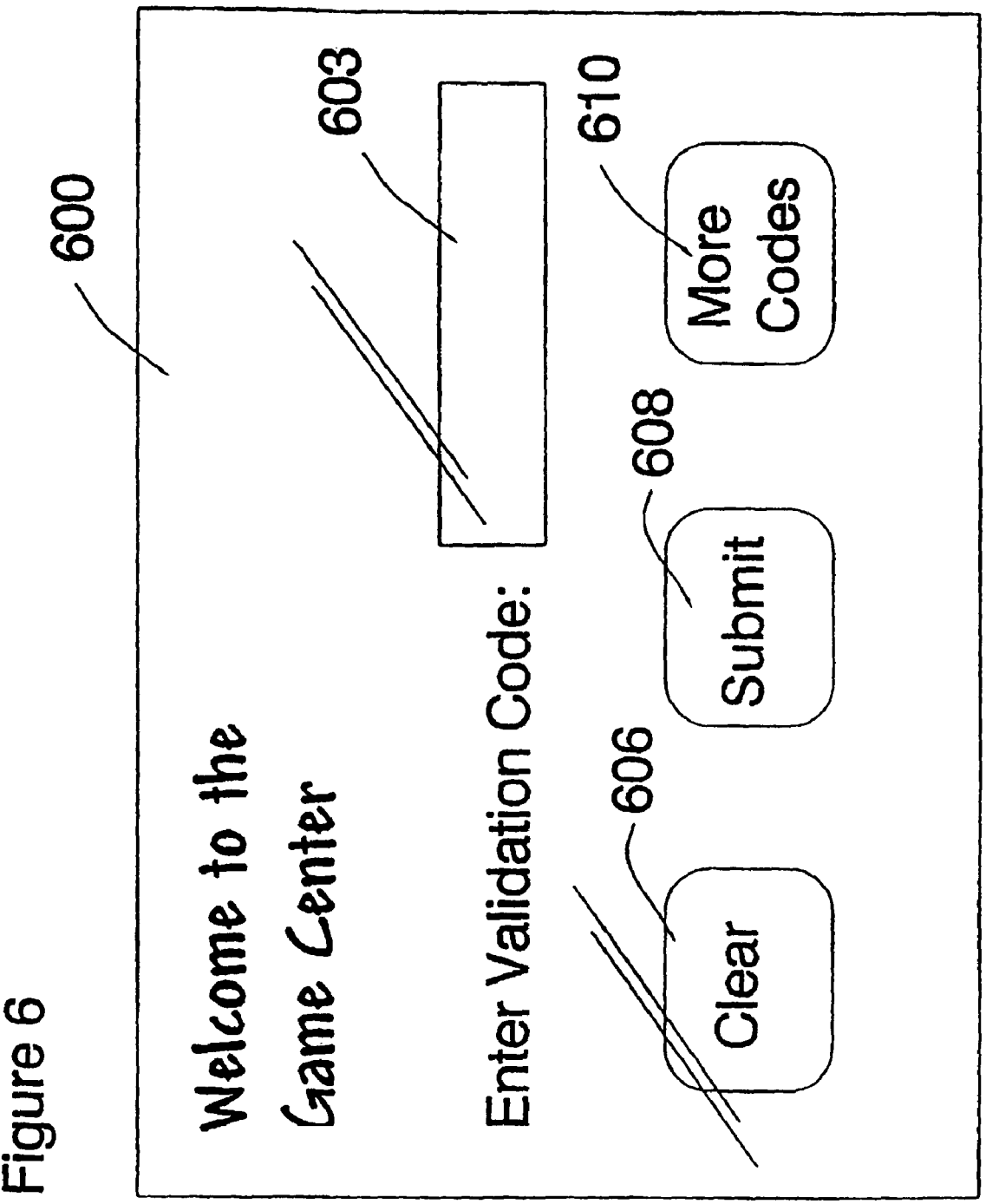
FIG. 6 illustrates another redemption form for submitting a validation code.

It should be understood that other relationship tables can be used to define a relationship between a validation code and a predetermined number of e-points. What is important to this embodiment of the game is that a known reward be correlatable through the relationship table with a particular input code. Thus, a single validation code can be used to provide the same result as using separate master-code and sub-codes: instead of separately entering into the machine 304 the master-code and sub-code, a validation code can be entered in one step or in one continuous series of steps (see, e.g., the validation code 1102 of FIG. 11). A single validation code is entered, for example, using a redemption form 600 of the type shown in FIG. 6. The validation code is entered in a validation-code field 603, and any additional validation codes are entered by pressing the more-codes button 610. If the player makes an error in entry, the clear button 606 will clear the form. Otherwise, the submit button 608 causes the validation codes to be processed and causes a subsequent page to be displayed which permits the player to select an internet service or site from a selection of designated services and sites.

Figure 11:
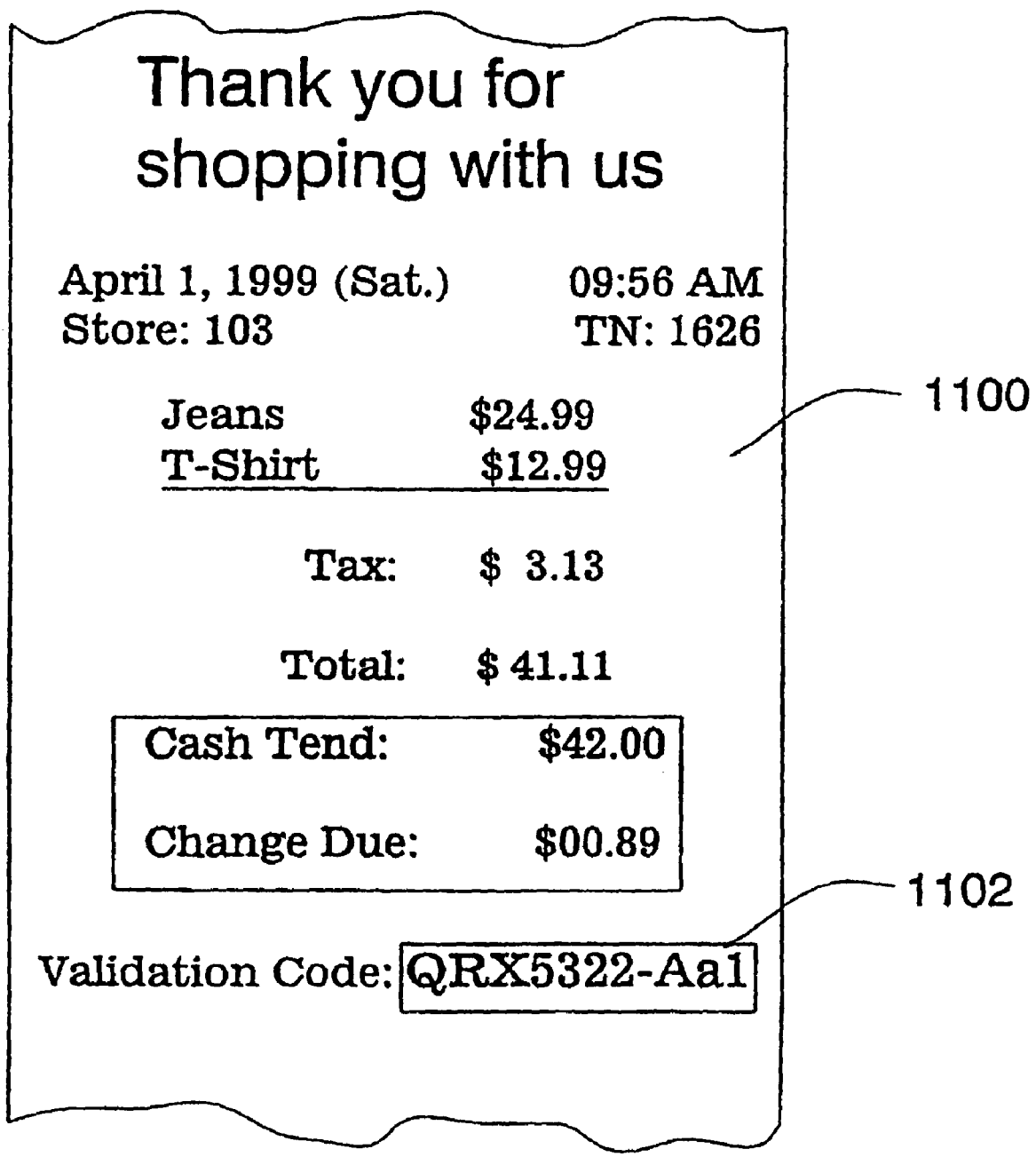
FIG. 11 illustrates a variation on the printed receipt of FIG. 9.

The single validation code entered into the redemption form 600 can be processed by the host system 302 in the same manner as the separate master-code and selected sub-code, substantially as described above. The database 300 in this arrangement stores a relationship table such as Relationship Table B shown below. That table shows for a typical game card 100A the association between the single validation code and the number of e-points to be awarded. The game card 100A provides the player with a choice of six validation codes, only one of which can be redeemed using the redemption form 600 prior to the game card 100A being voided. However, only one validation code need be provided on a given game card, as shown in FIG. 11.

| RELATIONSHIP TABLE B | | | | |
| --- | --- | --- | --- | --- |
| Card No. | Validation Code | e-Points | Card Void? | Store No. |
| 100A | QRX-5522-Aa1 | 5 | N | 3400 |
| 100A | QRX-5522-B22 | 10 | N | 3400 |
| 100A | QRX-5522-Cc3 | 15 | N | 3400 |
| 100A | QRX-5522-414 | 5 | N | 3400 |
| 100A | QRX-5522-5q5 | 5 | N | 3400 |
| 100A | QRX-5522-6Q6 | 0 | N | 3400 |

The first seven characters of the validation code for each of the choices on the game card 100A are preferably the same and uniquely assigned so that each of the validation codes of a particular game card can be flagged as void once any of the validation codes has been entered into the redemption form 600. As in the prior example, different numbers of e-points can be earned from one game card, depending on the validation code that is selected by the player and submitted for matching at the host system 302.

Figure 7:
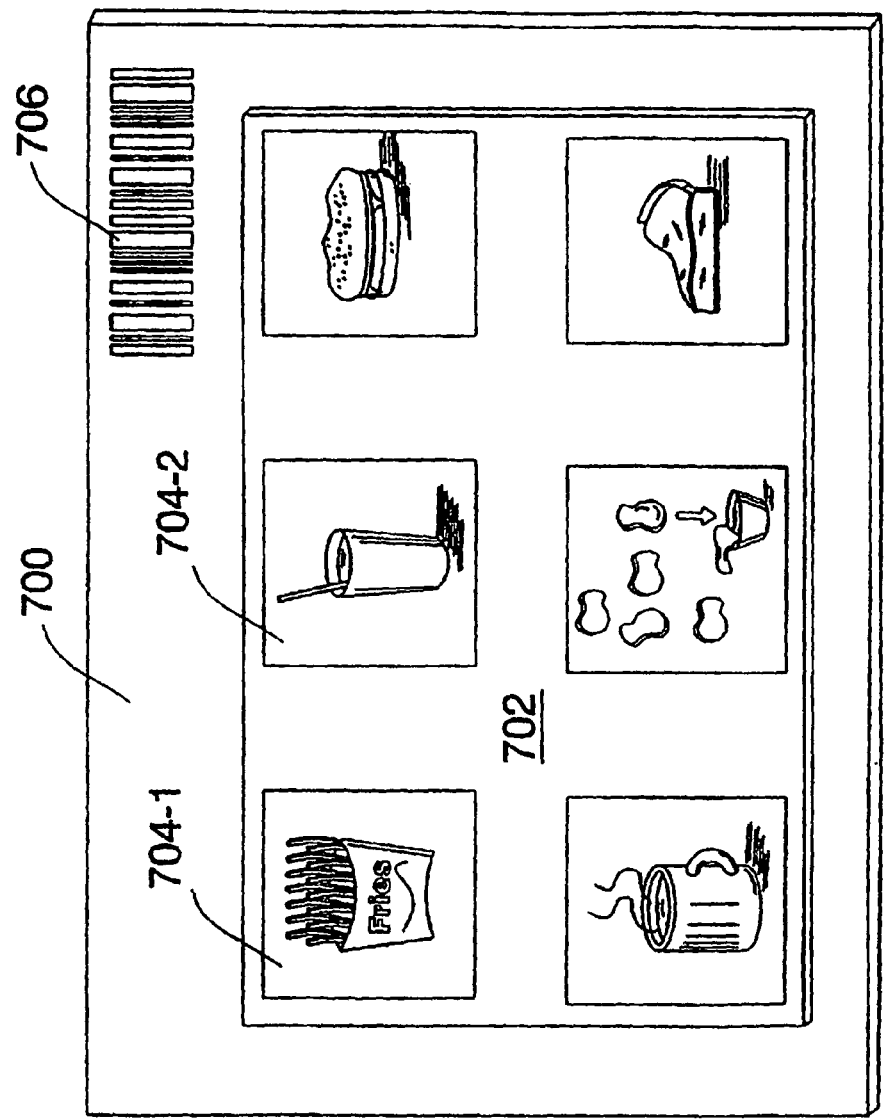
FIG. 7 illustrates a game card supporting a sequence of icons as the validation code.

In lieu of characters, the validation code (or the master-code, the sub-codes, or both) may take the form of icons or images. With reference now to FIG. 7, a game card 700 is illustrated which has a validation code 702 consisting of an arrangement of six icons 704-1, 704-2, . . . , 704-6. In addition, the game card includes a machine readable code 706. As with the game card 100 of FIG. 1, the player validates the game card and redeems the e-point reward, if any, by entering the validation code into a redemption form presented on a display of the machine 304. A suitable redemption form for inputting icons is shown in FIG. 8.

Figure 8:
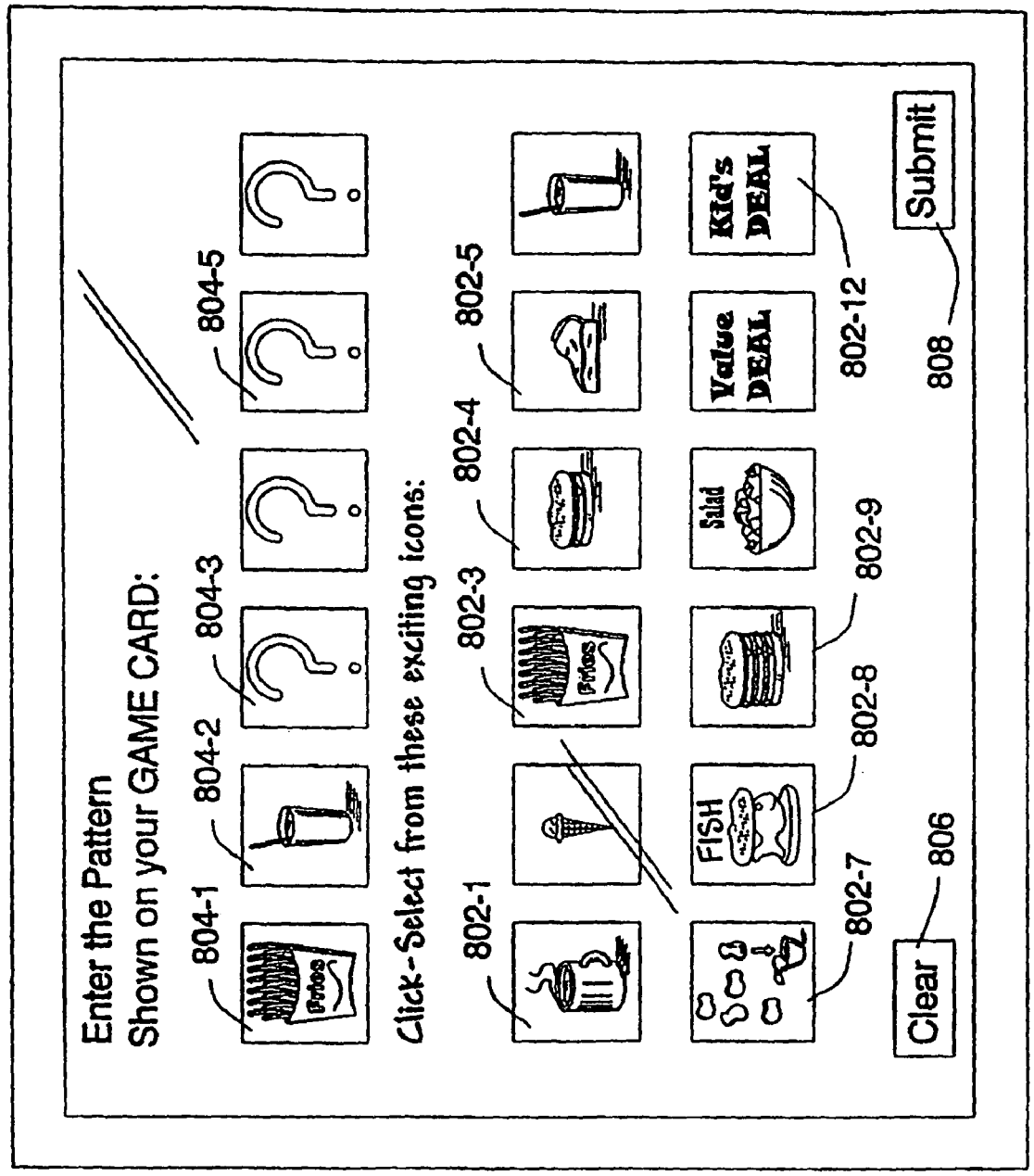
FIG. 8 illustrates a redemption form suitable for submitting the sequenced icons from a game card of the type shown in FIG. 7.

FIG. 8 illustrates a redemption form 800 which displays a plurality of icons 802-1, 802-2, . . . , 802-*n*. Preferably, there are more icons 802 displayed in the redemption form than are printed on any game card 700. Using a mouse or other input device connected to the machine 304, the player selects six icons in succession from among the icons 802 in the redemption form by clicking a mouse button when the cursor is positioned over the icon. Each time the mouse button is pressed, an icon 802 is displayed as a code entry 804 in the form. Standard graphical user interface (GUI) programming and function calls are used to determine which icons were selected by the player to be displayed as a code entry 804 in the form 800.

With further reference to FIG. 8, the player has click-selected from among the icons 802 the first two icons 704-1 and 704-2 that appear on the game card 700. As a result, code entries 804-1 and 804-2 depict those two icons from the game card. The player continues click-selecting icons from among the icons 802 to recreate the pattern printed on his or her game card 700. During code entry, errors can be cleared using the clear button 806. When all six (or however many) icons 704 have been correctly entered so as to match the arrangement on the game card, the player submits the validation code using a submit button 808. As described above, additional codes can be entered by signifying to the host system 302 that the player has more game cards. The more-codes button can be provided on the redemption form 800 or can be part of a further page or frame.

A particular benefit arising out of the use of game cards having icons on them is that the players interact with the products of the game sponsor and so the products are brought to the customers' respective minds outside of the store or conventional advertising environment.

2. Pre-Printed Game Card with Dynamically Determined Number of E-Points

The relationship tables A and B described above associate a predetermined number of e-points with each validation code, whether the validation code comprises a single code or has separate master-code and sub-code portions. However, the invention is not so limited. The codes may be used simply to validate or register the game card in the host system 302 (see Section E below), or may be assigned a number of e-points at the time that they are submitted for redemption.

Figure 5:
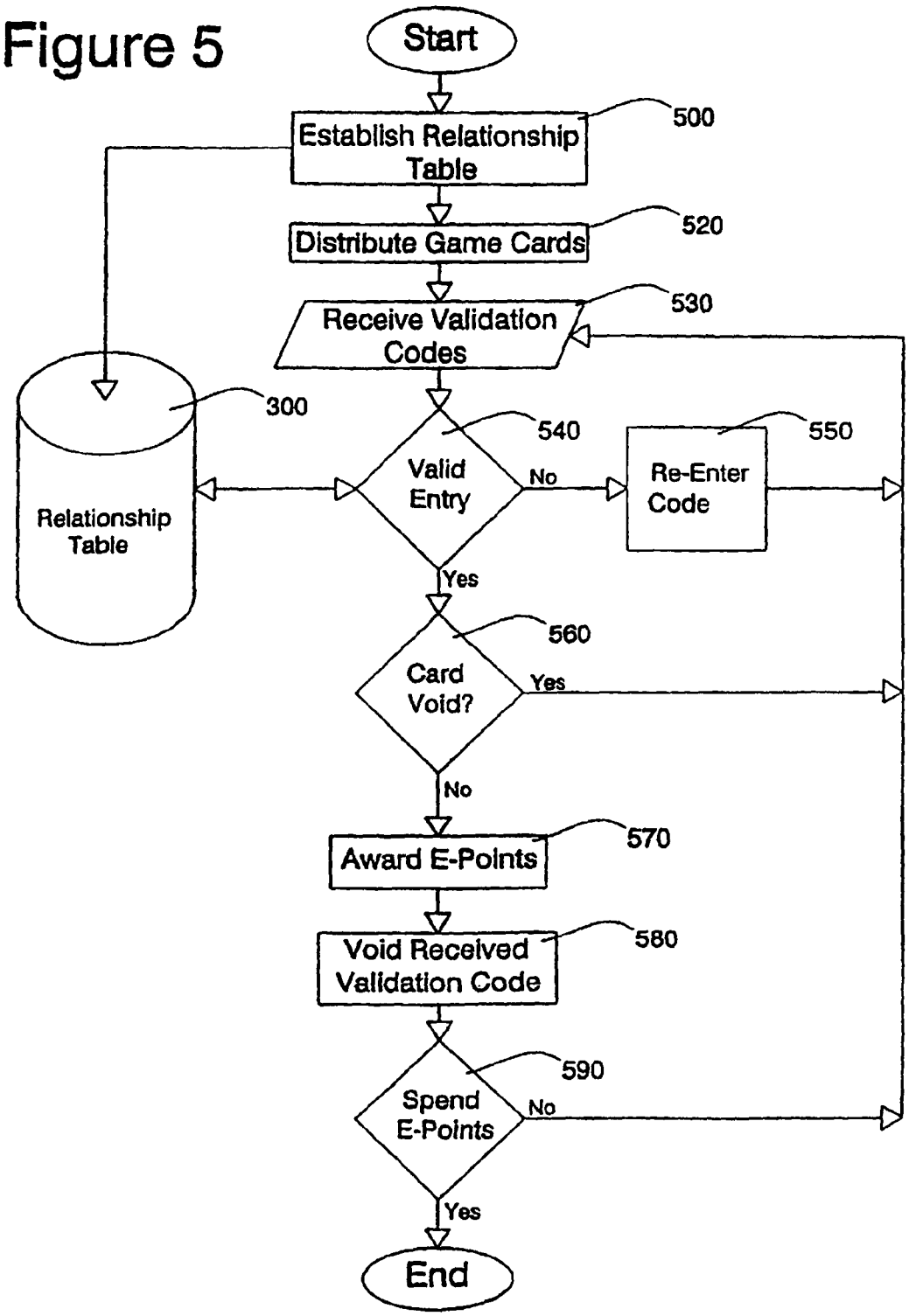
FIG. 5 illustrates a flow diagram in accordance with a preferred method of the invention.

Assuming that e-points are to be awarded, the validation code can be entered as previously described in accordance with the steps illustrated in FIG. 5. However, at step 570, the e-points awarded are not a predetermined number associated in any table with the input validation code. Rather, the number of e-points awarded is determined dynamically, for example, using a random number generator (RNG) or a pseudo-random number generator (PRNG). Known RNG and PRNG functions can be used by the host system 302 by a conventional function call to that routine which returns a number within prescribed limits (e.g., between 0 and 120). The number returned by the routine is then awarded at step 570 to the customer.

The number of e-points awarded to a player can be determined other than randomly, for example, more points awarded to first corners, frequent shoppers, etc. What is important to this alternative embodiment is that the number of e-points awarded are assigned at the time that the player redeems the validation code rather than at an earlier time such as when the relationship table is established. Thus, a relationship table in accordance with this embodiment of the invention would be similar to Relationship Tables A and B above, except there would be no need to store, access, or associate a number of e-points with each validation code.

Figure 9:
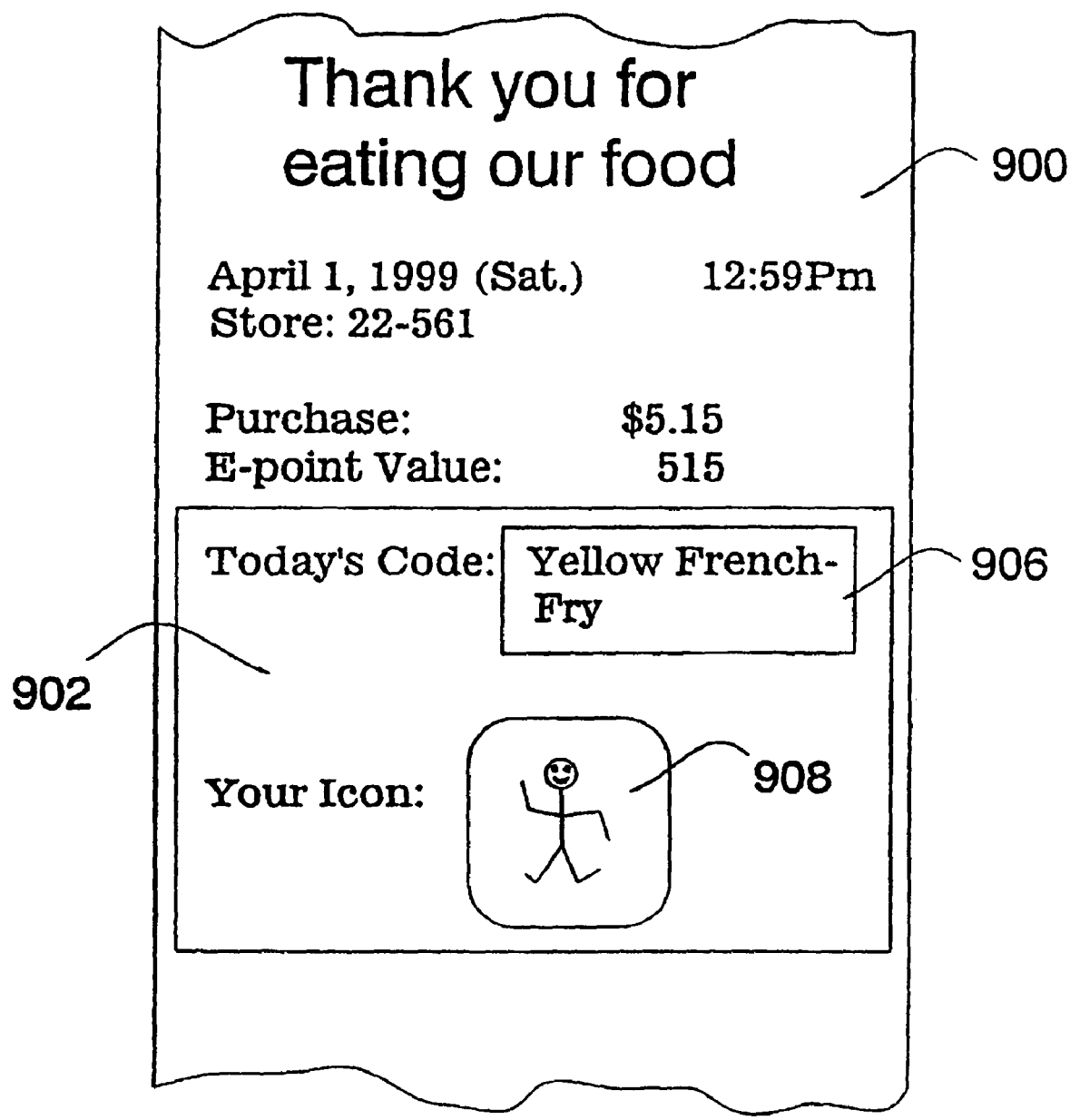
FIG. 9 illustrates a receipt upon which a validation code is printed in accordance with a second embodiment of the invention.

3. Purchase Transaction Receipt with Predetermined or Dynamically Determined Number of E-Points In lieu of pre-printed game cards, the method of the present invention may have the validation codes distributed to players on a receipt printed as a result of a purchase transaction. FIG. 9 illustrates an exemplary receipt which includes a validation code 902 consisting of a master code 906 ("Today's Code") in the form of an string of characters and a sub-code 908 ("Your Icon") in the form of a stick figure image. The printed receipt 900 is similar to the pre-printed game card 200, and may include plural icons. The receipt typically includes other information including one or more of the following: the amount spent, the items purchased, the date, day, time, store number, transaction number ("TN"), cash tendered, and change given. If a credit or debit card is used, the receipt may include a portion of the card number printed on the receipt to identify the card that was used, as well as other card-related information (card holder's name, whether cash was given back to the customer, etc.).

Figure 10:
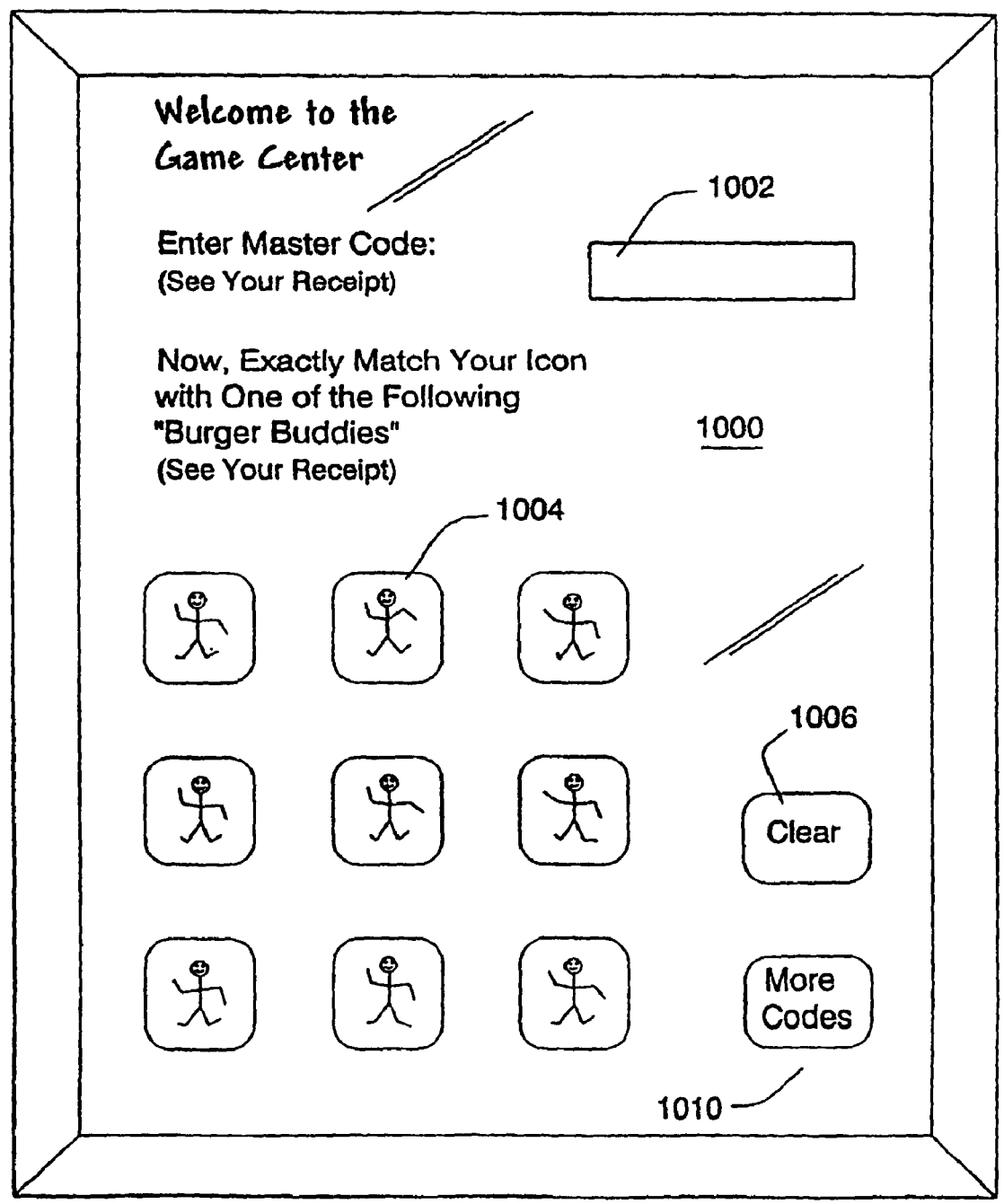
FIG. 10 illustrates a redemption form suitable for submitting validation codes from receipts of the type shown in FIG. 9.

The receipt 900 indicates that on Apr. 1, 1999, the customer spent $5.15 and earned 515 e-points which may be redeemed using a suitable redemption form, such as the redemption form 1000 of FIG. 10. Upon accessing the host system 302, the customer can enter the master code 906 ("Yellow French-Fry") in the master-code field 1002 and click-select the icon 1004 in the sub-code portion of the form that corresponds to the icon 908 printed on the receipt 900. The e-points are awarded if the entered master-code and sub-code are associated in a relationship table, such as one of the above-described relationship tables. As with the previously described forms, the customer can clear the fields using the clear button 1006 or input additional codes using the more-codes button 1010.

A variety of icons can be printed on the receipt 900 to make it difficult for one person to advise another of the proper code. In addition, the display of icons (sub-codes 1004) in the redemption form 1000 can be randomly shuffled each time a customer accesses the form so that a given icon (such as the icon 908 printed on the receipt) appears in a random position in the form. Also, other information can be used by an icon-selection routine to select a particular icon to print on the receipt. For example, on any given day, the "Today's Code" may be fixed, but the icon 908 may vary with the amount spent, the time of day and the transaction number, and that further information may be entered into the form 1000 as an integrity check to ensure that the player is an actual customer and not someone attempting to gain access to e-points.

Another printed receipt 1100 which includes a validation code 1102 is shown in FIG. 11. The validation code may comprise any of the codes previously described, and most preferably has a form (e.g., alphanumeric characters) which readily can be printed along with the other details of a given purchase transaction by a printer that is connected to the point of sale (POS) terminal. The receipt typically includes other purchase transaction details and information, as described above. Preferably, the receipt 1100 further includes a machine-readable code 1104 or is printed with magnetic ink to facilitate the award of any benefits at a dirt world store.

Figure 12:
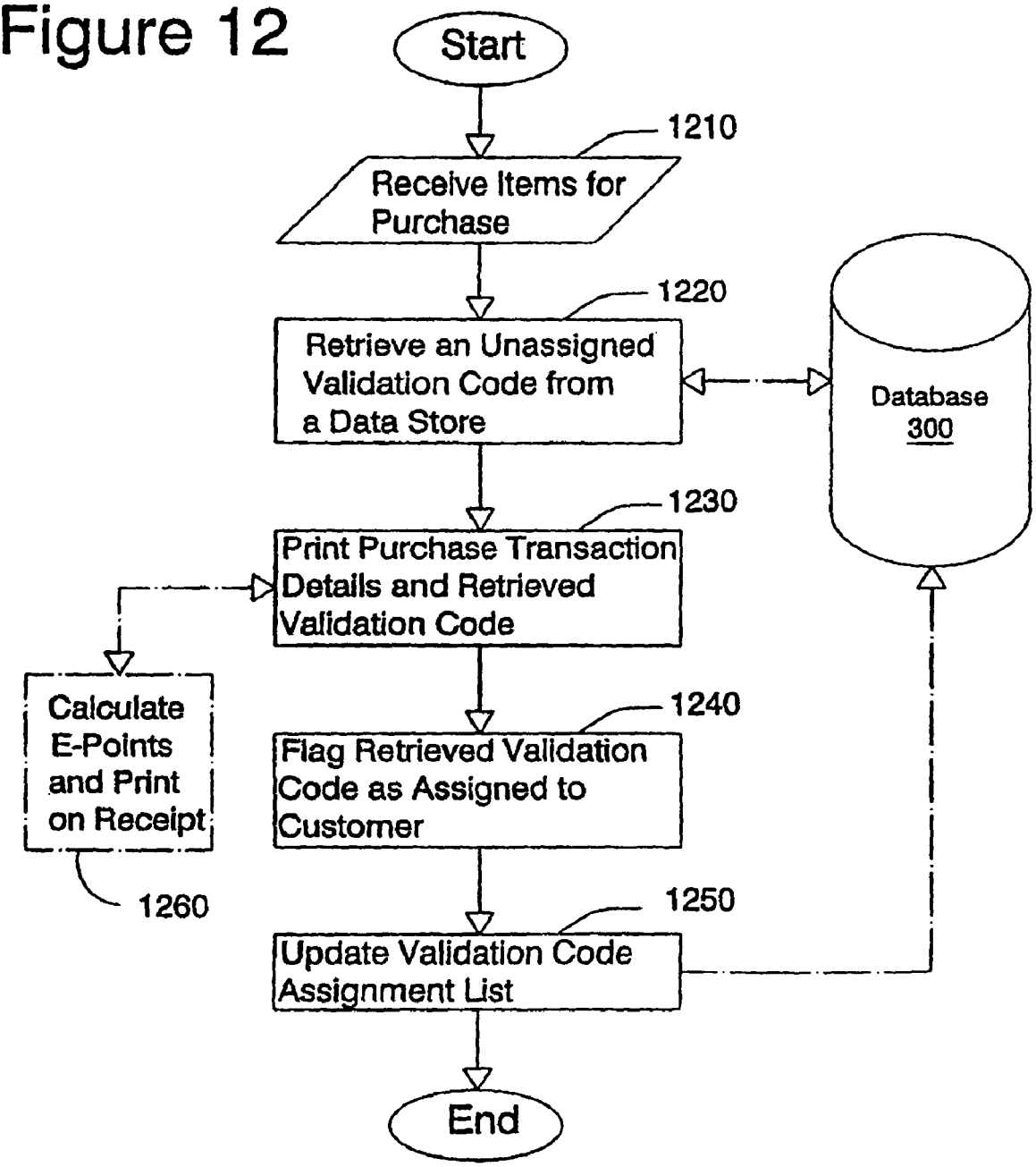
FIG. 12 illustrates a flow diagram in accordance with the second embodiment of the invention.

In addition to conventional processing, a POS terminal which distributes validation codes in accordance with this aspect of the invention is configured to print a unique validation code on the receipt for each purchase transaction. In FIG. 12, the POS terminal receives items for purchase by the customer at step 1210 in any conventional manner such as by keying in the price or code of a product or by scanning a machine-readable code on the product's packaging. An unassigned validation code is preferably retrieved at step 1220 from a data base such as the database 300 or other central data store. At some time before a purchase receipt is fully printed (including a time just before the purchase items are received), at step 1230, the POS terminal prints the purchase transaction details along with the retrieved validation code onto a receipt.

The retrieved validation code may be flagged as having been assigned to a customer as at step 1240 and the database of validation codes used by the POS terminal then may be updated at step 1250 to ensure that each validation code is printed on only one receipt. Instead of flagging the validation code as having been assigned to a customer (that is, having been printed on a receipt), the validation code can be removed (e.g., popped) from the list of remaining unassigned validation codes.

It should be understood that more than one POS terminal may access the same data store of validation codes. Each POS terminal is connected either directly or indirectly through a network to the host system 302 so that it has access the validation codes in the database 300. The connection can be continuous, for example, using a dedicated line, or temporary, for example, using a modem or the like. Because of the POS terminal has access to the entire series of validation codes in the database 300, players can be provided with unique validation codes on each of their register receipts instead of on pre-printed game cards, with a predetermined number of e-points being associated with each such receipt, or with a dynamically determined number of e-points awarded upon registering the validation code, as described in section headings A and B above.

The validation codes can be retrieved directly from the database 300 or from a local data store which has been provided with a number of unassigned validation codes. The unassigned validation codes are available to each POS terminal at a particular store for assigning to respective purchase transactions. The validation codes are retrievable through a program call to a routine or data store which returns the validation code and places it in the printer buffer to be printed on the receipt 900, 1100. The program call may be placed within a receipt-printing routine of the POS terminal so that it is executed along with the other instructions in the print routine. The program call can be configured to flag the validation code as assigned, or cause the validation code to be removed (e.g., popped) from the list of unassigned validation codes.

4. Purchase Transaction Receipt with Number of E-Points Based on Purchase Transaction Details Another method in accordance with the invention awards e-points on the basis of purchase transactions made by a customer. The number of e-points to be awarded in this embodiment varies with each purchase transaction and so the award must be calculated at the POS terminal or at another machine to which the terminal is connected. At a time shortly after the purchase transaction is made, the computed number of e-points is reported back to the host system 302 along with its assigned validation code for inclusion in the database 300. This enables the customer to enter the code into a suitable redemption form, such as one of the redemption forms of FIGS. 4, 6, 8 and 10. This method may proceed as described above in connection with FIG. 12, except that the number of e-points awarded is calculated and printed on the receipt, as shown in phantom, at step 1260.

The validation codes are preferably established at the outset of the game and a number of validation codes are distributed to each POS terminal and/or store for printing on individual receipts. Alternatively, the validation code can be generated using the purchase transaction details and then printed at step 1230 onto the receipt. The validation code along with the awarded number of e-points is thereafter provided to the host system 302. A suitable validation code generator is described in U.S. Pat. No. 5,892,827 of Beach et al.

E-point awards can be valued at one point per penny spent, can be awarded in rounded amounts (i.e., by the tens or hundreds), and other correlations between amount spent and e-points earned are within the scope of the invention. Thus, differing amounts of e-points can be awarded for the same amount spent, with the variation in the award being a function of the products that were purchased. For example items or services for which there is an excess inventory or an ongoing promotional campaign may be awarded more e-points than other items or services.

E. Game Card or Receipt Validated Online

By distributing validation codes to players and customers which are validated at an internet site (e.g., at a web page maintained by the game-sponsoring organization), the game of the present invention provides players and customers alike with a reason to visit a particular internet site. In accordance with a further aspect of the invention described under the present section heading, the player or customer is given an incentive to return to the retail store, in addition to or instead of an award of e-points.

Figure 13:
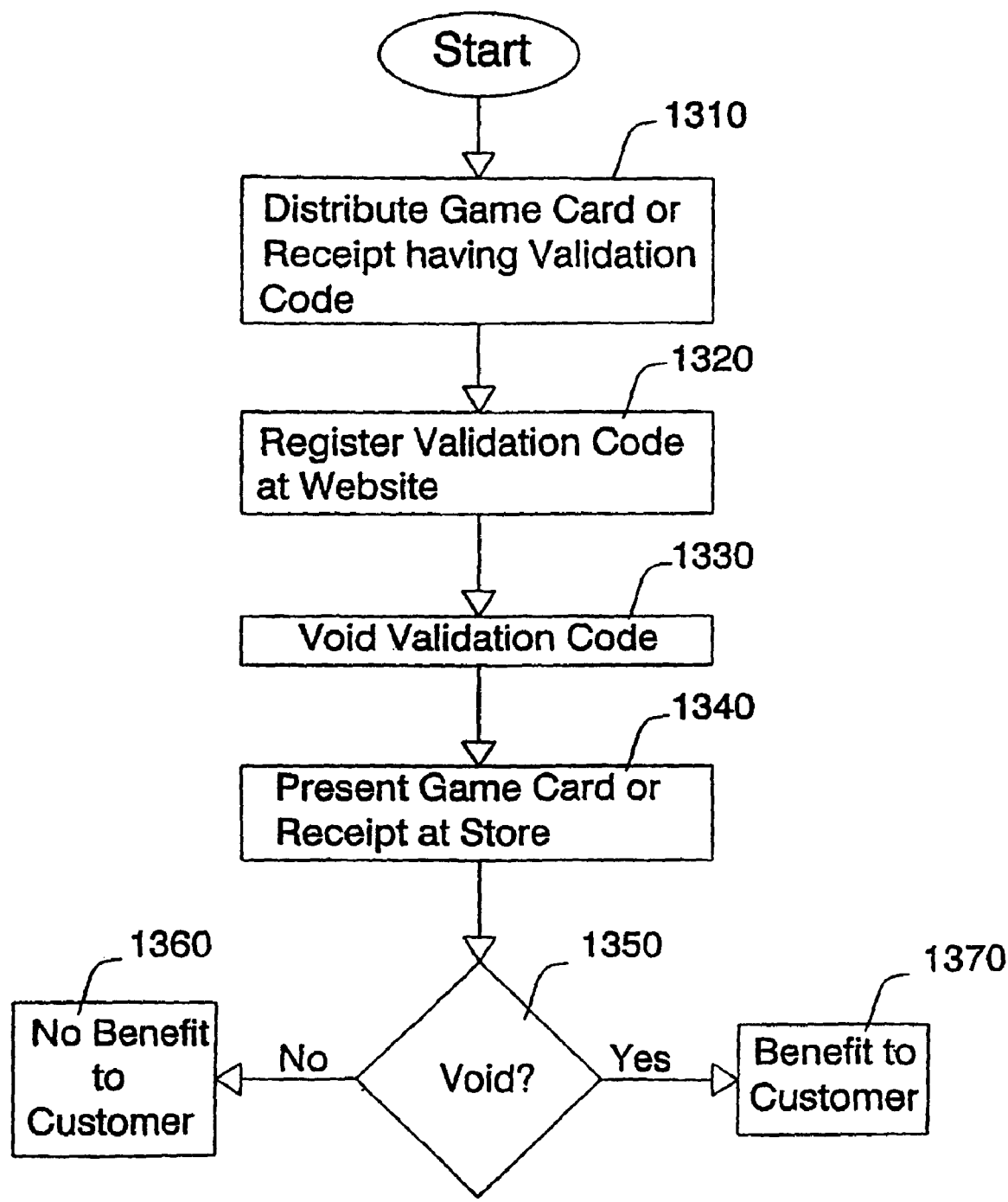
FIG. 13 illustrates a flow diagram in accordance with a third embodiment of the invention.

In FIG. 13, a game card or receipt such as shown in FIGS. 1, 2, 7, 9 and 11, is distributed to a customer at step 1310. The game card or receipt supports a visible validation code, as previously described. The customer thereafter accesses the host system 302 and enters the validation code into a redemption form (see FIGS. 4, 6, 8, and 10). In other words, the validation code is received at a designated internet site. At step 1320, the validation code is registered at the designated internet site, which is maintained at the host system 302. As described above, the game card or receipt is "voided" when the validation code entered into the redemption form is received at the designated internet site, as shown at step 1330.

If the customer were to re-enter the validation code into the redemption form, it would register as void. If e-points were awarded the first time that the validation code was entered, none would be awarded on the second attempt to redeem the reward. Thus, with respect to e-point awards, the game card or receipt is exhausted.

However, the "void" status of the game card or receipt has a second use when presented at a predetermined store, as at step 1340. The store either scans the machine readable code on the game card or receipt (see codes 104, 204, 706) or the validation code is entered at the POS terminal (or another terminal in communication with the validation code database). At step 1350, the terminal determines whether the validation code on the card was previously voided online by accessing a data store in communication with (or which is the same as) the database 300 or whichever data store maintains the voided-card status information. If the code was not previously voided then the customer receives no further benefit (step 1360). However, if the card tendered by the customer was voided online, then the customer receives a benefit for returning to the store, for example, a free item or a discount on the present or a subsequent purchase at that store or some other store. In this manner, the invention directs consumer traffic to a designated internet site or service and then to a store, for example, the store where the game card (or receipt) was initially obtained.

It should be understood that the customer may have to click-through several screens at the designated internet site to get to the redemption pages. This permits the game sponsors to present the player/customer with other information including advertisements, catalog items and promotional materials up to and perhaps including the display of the redemption form.

F. Arrangements with Indirect Access to the Designated Internet Site(s)

Figure 14:
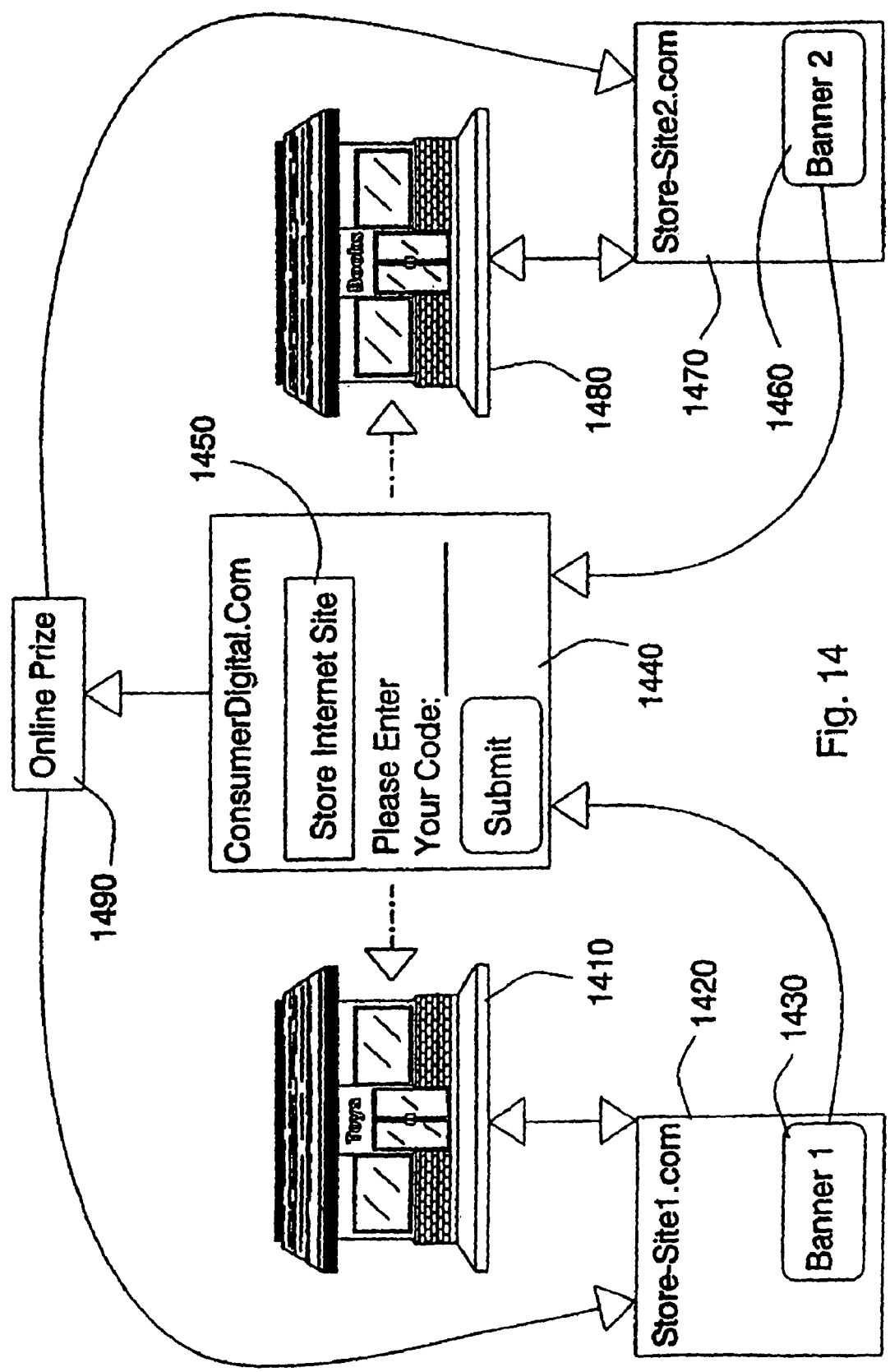
FIG. 14 illustrates an arrangement in which an individual indirectly accesses an Internet site designated for processing validation codes.
Figure 15:
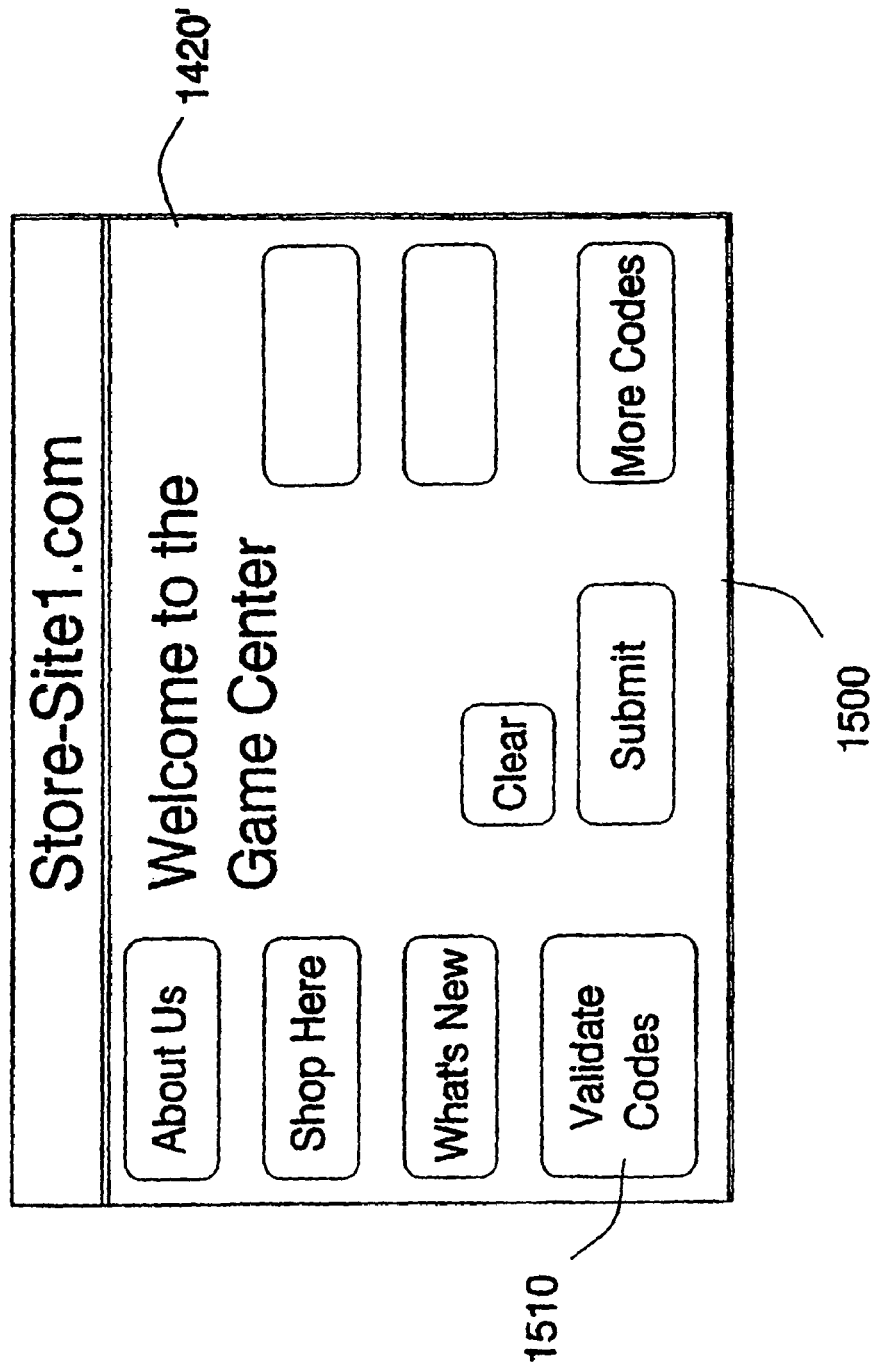
FIG. 15 illustrates a Web page in which the validation code processing function is handled a frame of a frameset loaded at a store's Web site.

In use, a user can access a variety of Web sites from his or her machine 304 over the Internet 306, including the Web site of a host system 302. In the arrangements of FIGS. 14 and 15, the customer is indirectly encouraged to visit the "consumerdigital.com" Web site by selecting a banner ad, icon, or button provided at another Web site (namely, Web sites 1420 and 1470). In these arrangements, the customer is directed to a designated internet site ("consumerdigital.com"), but need not know that he or she has navigated to another page.

In the arrangement of FIG. 14, individuals indirectly access the Web site of the host system 302 from another Web site. FIG. 14 shows links from the Web pages of two different stores to a common host system 302. In particular, the stores 1410 and 1480 have outsourced the code-processing and prize-awarding features of the present invention to the server that supports the Web page 1440, instead of hosting those functions themselves. Thus, a customer browsing or shopping at the store 1410 can enter a validation code from a receipt, game card, or other source and thereafter access that store's Web site 1420. The customer may have to navigate through a number of pages at that Web site before being presented with an opportunity to validate the code that he or she received at the store; however, that is not required. At least one of the pages at the Web site 1420 includes a banner, button or other "selectable-link" 1430 which directs the customer to a different and designated Internet site, and, more particularly, to the host site 1440 which is hosting the code-processing and prize-awarding functions of the present invention.

The host site 1440 displays a redemption form and a submit button as described above. Preferably, a banner space 1450 is provided which includes data from the linking Web site. In other words, the name of storesite1 will appear in the banner space 1450 if a customer accesses host site 1440 from storesite1.com, and the name storesite2 will appear in the banner space if the customer accesses the host site 1440 from storesite2.com. The host site 1440 can thus be provided with a chameleon-like characteristic which causes the host site to identify itself with the name of the Web site that accessed it. The linking site provides information to the host site to identify itself so that its continued right to access the code-processing and prize awarding features can be ascertained. If the linking site has the authority to access these features, the customer can then enter a code. In the event that a valid and non-void code is entered, the customer will be awarded e-points that can be used online (e.g., at the host site 1440 or another site 1490), or will receive a benefit if the code is thereafter presented at a predetermined store or Internet site.

As understood by those of skill in the art, there are several ways to determine from which Web site a customer has come when he or she accesses the host site 1440. As one example, a simple form having a visible "Click Here To Submit Validation Code" button and a hidden store identifier can be presented to the customer in the banner space 1430, 1460. Such a form is shown below in pseudocode.

```
<form
    name=StoreId
    action="http://www.consumerdigital.com|cgi-bin/nextbanner.htm"
    method="post">
    <input type=hidden name="WhichStore" value="Jeans Plus">
    <input type=hidden name="ResponsePage"
    value="http://www.consumerdigital.com/mainpage.html">
    <input type=submit value="Click Here To Submit Validation Code">
</form>
```

Upon clicking the button 1430, such a form is posted to a bin for processing by a conventional server-side form processor. The form passes two fields of data, neither of which is displayed on the customer's browser. Specifically, the form passes the name of the store accessing the Web site 1440, which in this example is "Jeans Plus." In addition, the form identifies the next Web page to display at the Web site 1440 after posting the form, which in this example is "mainpage."

Alternatively, the code-processing and prize-awarding functionality can be handled within a frame 1500 in a frameset loaded at the store's Web site 1420', as shown in FIG. 15. A series of buttons for navigating the Web site 1420' are provided in a main frame, including a button 1510 which causes a redemption form to be displayed in the target frame 1500. Once the customer submits the code(s), he or she can either enjoy online sites and services by spending any e-points that are awarded, or can present the voided game code at a virtual or dirt-world store to receive a benefit (for having gone to the store 1410 after voiding the validation code). If e-points are awarded, the prize can be enjoyed in a frame presented in place of the frame 1500.

A customer who initially receives a validation code at the store 1410 can void the code online and then obtain a benefit at a different store such as the store 1480, as illustrated in the following example.

EXAMPLES

Example 1

A retail clothing store 1410 and a retail music store 1480 cater to the same demographic group. Through a cross-marketing arrangement, each store offers discounts to the customers of the other if their respective customers first void a code provided at a designated Internet site. Thus, a customer at the clothing store may have to register a code on a game card or receipt at the Web site of the music store and vice versa. If the customer thereafter visits the other store (within any specified time period), he or she will receive the discount. Fees can be exchanged between the two (or more) stores for directing consumer traffic their way, for example, a fixed fee or a percentage of the sale. Of course, both stores must have access to the registered codes so that the customer's compliance with the go-online requirement can be tested.

G. Benefits and Prize Awards

For cash transactions, the customer can remain anonymous and still enjoy benefits and prize awards—a distinct advantage over competing technologies for certain transactions and segments of society.

Figure 16:
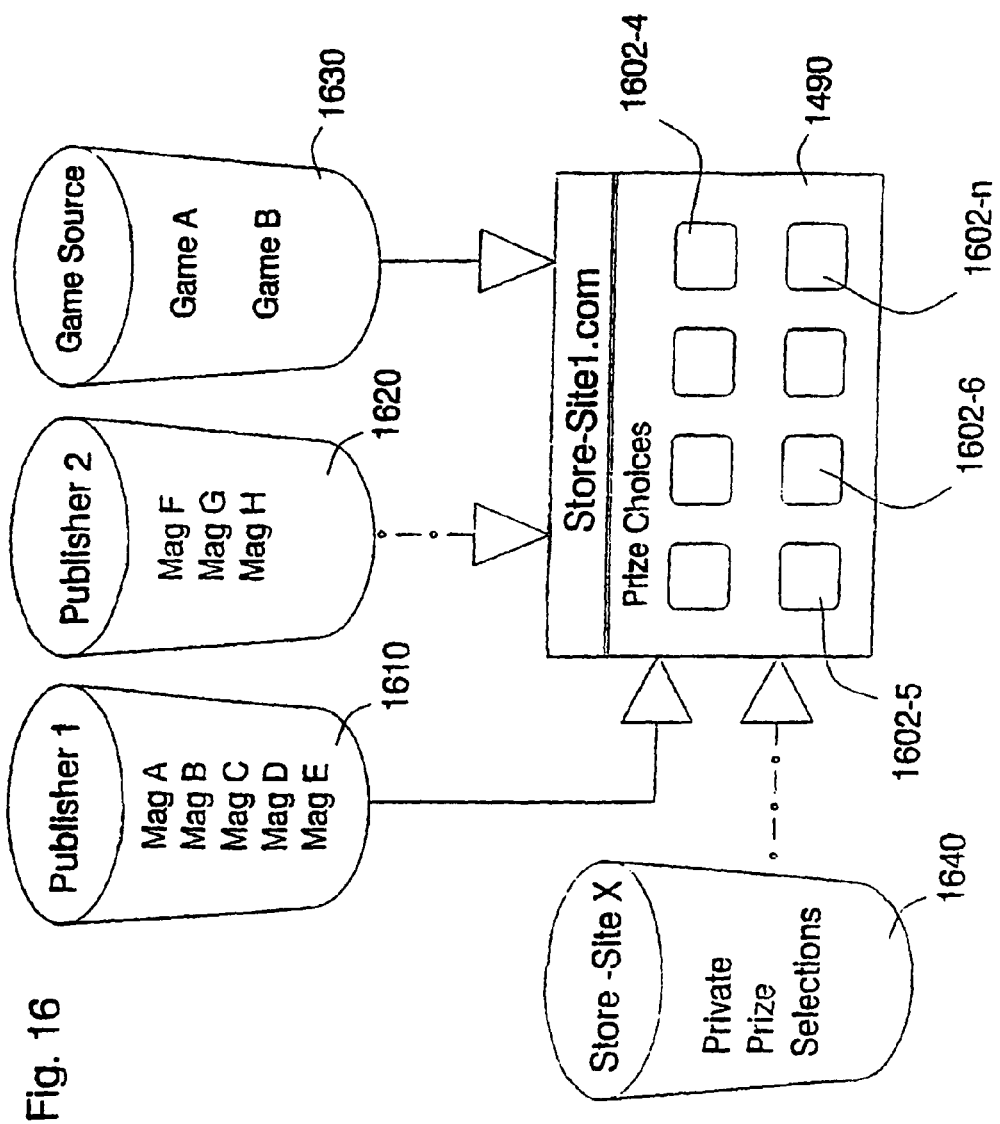
FIG. 16 illustrates an online prize-page and third-party prize sources.

With reference now to FIG. 16, the online prize page (or frame) 1490 is illustrated in greater detail. The prize page 1490 provides selection icons 1602-1, . . . , 1602-4, . . . , 1602-$n$ from which the user can select a prize to enjoy online. The selection icons 1602 may comprise, for example, selectable-links and most preferably anchored images (e.g., GIF, JPG or other image files, compressed or not compressed (e.g., a BMP file)) representative of the various prizes that can be selected. As described above, the prizes include access to Web sites, games, magazine articles, and other services that are generally only available through subscriptions or on fee basis (pay-per-view or pay-for-use). The prizes can come from a variety of sources. In FIG. 16, two different publishers 1610, 1620 each having several magazines (publisher 1610 having magazines A-E and publisher 1620 having magazines F-H) are associated with the prize page 1490, as indicated by the connecting arrows. In addition, the prize page may be associated with one or more game sources 1630. The illustrated game source 1630 has two games available, game A and game B. Other prizes can be associated with the prize page 1490 such as private prize selections 1640, provided by or for the benefit of visitors to the storesiteX Web site.

The set of selection icons 1602 to be displayed on the prize page 1490 can be dynamically determined so that only the prizes that the user can select with the number of e-points that have been awarded are presented. For example, prizes that require more e-points than the user has may not be displayed, or can be displayed but rendered non-selectable (e.g., using a DHTML script to not provide (or to eliminate) anchor tags from around the selection icon(s) 1602-x for which the user does not have sufficient e-points.

Figure 17B:
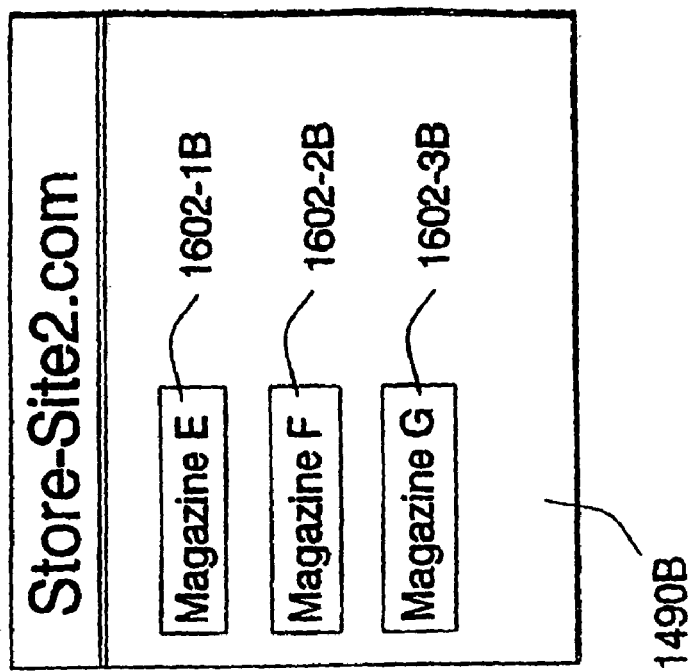
FIGS. 17A and 17B illustrate two exemplary prize pages.
Figure 17A:
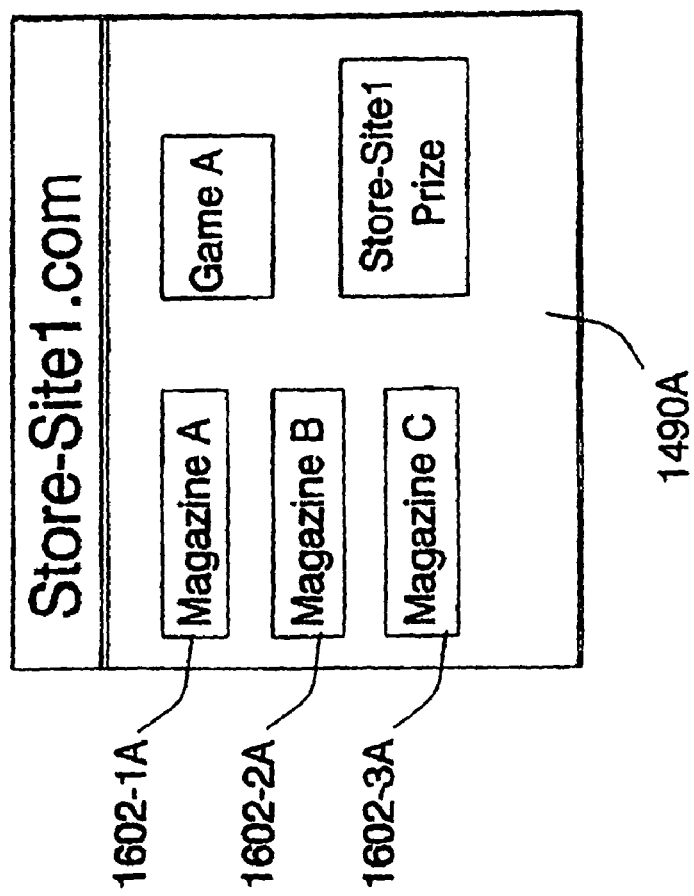

FIG. 17A illustrates an exemplary prize page 1490A made available from the storesite1.com Web site. The prize page 1490A offers customers who visited the storesite1.com Web page a selection of magazines from publisher 1610, a game from the game source 1630, and a private prize 1640. FIG. 17B illustrates an exemplary prize page 1490B provided by the storesite2.com Web site. This prize page 1490B only provides a selection of magazines from which to choose an article or story to read. The prize page 1490B provides a different selection of magazines than the prize page 1490A, namely, one magazine from the publisher 1610 and two from the publisher 1620. The prizes on the exemplary prize pages 1490A and 1490B constitute non-overlapping sets, although that is not required. In a practical implementation of the invention, the store 1410 may cater to younger customers who are more interested in playing games and reading about teen-issues or hobbies whereas the store 1480 may cater to an adult crowd and provide a more sophisticated selection of prizes (such as daily and specialty newspapers, professional journals and magazines, business articles, etc.).

Figure 18:
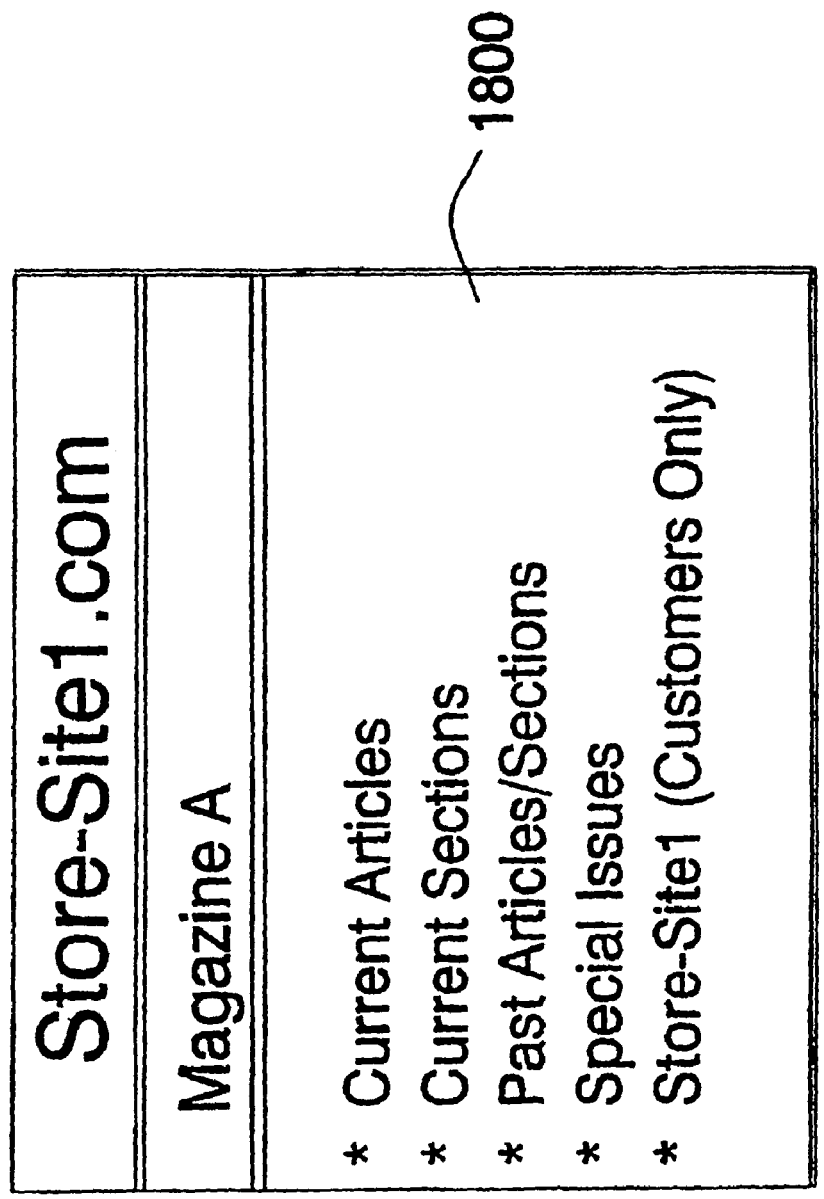
FIG. 18 is a Web page showing particular prize selections available to the user.
Figure 19:
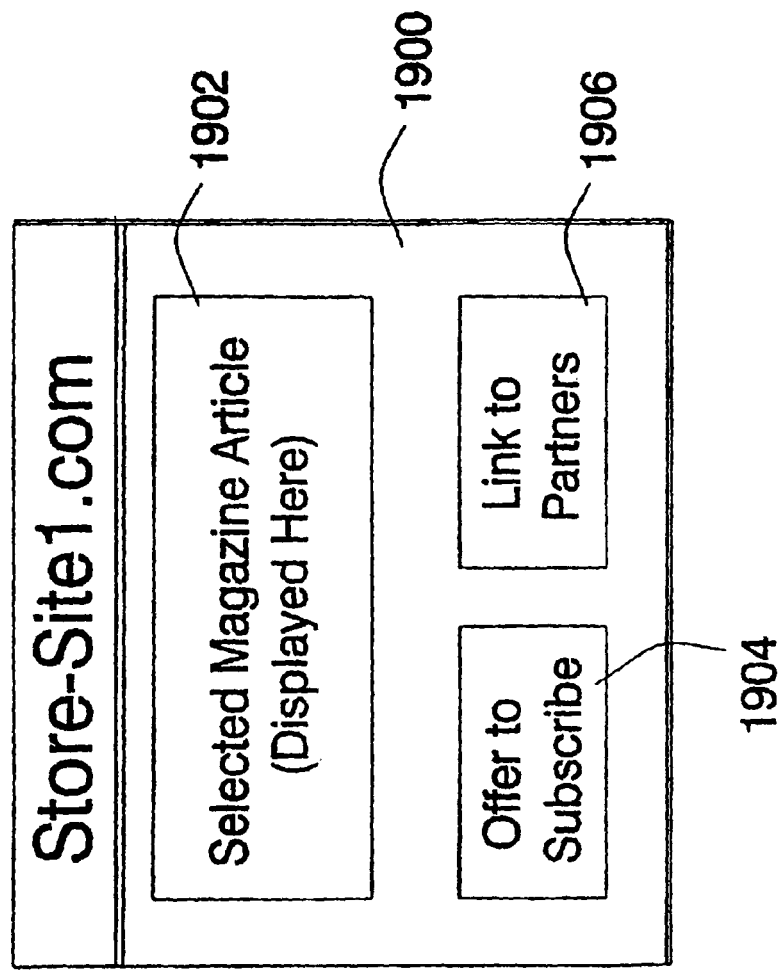
FIG. 19 is a Web page showing a particular prize selection selected by the user.

FIG. 18 illustrates a further Web page 1800 which is displayed after selecting the selection icon 1602-1A of FIG. 17A. The Web page 1800 presents the user with a more particular selection of articles and other items from which to select a prize to enjoy online. When the user selects a particular article or story or other prize, a further Web page 1900 is presented on the user's browser (FIG. 19) for displaying a selected article. The selected article is displayed within the Web page 1900, as at 1902. This Web page also includes buttons such as button 1904 which the user can use to indicate a desire to subscribe to the magazine, if they so desire, or press to link to "partner" sites, using the button 1906. If the selected prize was a game, the user might be presented with the opportunity to download the game for a fee after playing, if the user so desires.

The actions described above in connection with FIGS. 14-19 can be implemented in one or more methods in accordance with particular embodiments of the invention.

H. Electronic Distribution of Codes

The validation code can be supported on a variety of media, including but not limited to:

| Printed Media: | Electronic Media: |
|---|---|
| game cards | e-mail |
| receipts | web pages |
| bottle caps and inserts | frames |
| candy bar wrappers | banners |
| other product packaging blow-in cards from magazines free standing insert ("FSI") direct mail customized advertisements | |

In the case of electronic media, the code can be distributed over an electronic communication link from a server to a client. For example, the code can be conveyed within an e-mail from an e-mail server to the e-mail account of a user—if the user's identity is known. (In anonymous transactions in which a code is to be provided, the user must provide his or her e-mail address in order to be able to receive targeted e-mails or other information or offers.)

E-mails can be sent to a user in response to a purchase transaction that was made at a retail store or a Web site. U.S. patent application Ser. No. 09/250,358, entitled "DIGITAL TRANSACTION REPORTING WITH TARGETED ADVERTISEMENTS," filed Feb. 12, 1999, discloses a system and method for targeting a promotional offer or advertisement to a customer in response to a specific purchase at a retail store or at an internet site in which an account of the user is charged, and such patent application is hereby incorporated by reference as if set forth in its entirety herein. Alternatively, the e-mail can be sent (1) to audiences that are targeted in other ways, (2) to persons who have opted-in to receive messages from the e-mail source, or, less desirably, (3) to a variety of e-mail accounts through a mass "mailing" (so called spamming).

I. Outsourced Code Distribution

The code distribution function can be outsourced by participating stores and instead handled by a card issuer (e.g., by Visa®, Mastercard®, American Express®, Macy*s®, a specific bank such as Citibank®, etc.) as in the following example:

Example 2

A card issuer manages a promotional game through which participating stores offer discounts or online rewards if patrons first go to the participating stores, make purchases using the card issuer's card and then access a designated Internet site. The card issuer provides codes on the monthly statement or with e-receipts as described in the above-referenced patent application entitled "DIGITAL TRANSACTION REPORTING WITH TARGETED ADVERTISEMENTS." The customer accesses the site of the card issuer, and then links to a participating store's Web site to enter the validation code. (The validation code or other identifier optionally can be entered at the card issuer's Web site.) This flow requires the customer to only know one Web address (that of the card issuer) and not the Web addresses of each participating store. This flow also enables the card issuer to track interest in the promotion and assess a fee for each "hit," that is, for each selection by a customer of a particular store's Web site from the card issuer's Web site. Such tracking is conventionally accomplished by logging the relevant onclick events at the card issuer's site.

If the code is later presented at the participating store along with the card issuer's card, the card issuer can provide a credit on the customer's account, or advise the point-of-sale terminal that the condition for receiving the discount has been satisfied and apply the discount to the present retail transaction. This further event can be the basis of a royalty fee to the card issuer for playing a role in driving the repeat sale at that participating store.

J. User Supplied Codes and Codes Harnessed from Other Events and Things

In accordance with another embodiment of the invention, the user either enters a code or password of their choice or the code is harnessed from another medium. The code can be a screen name, or information from a ticket, conventional receipt, or lottery ticket. The code can be distributed to individuals in electronic form such as by generating and conveying a code within a banner ad that is to be displayed on the Web page of a particular Web site: Each time that a Web page with such a banner ad is addressed, a new validation code is generated. The validation code can be generated similar to the use of hit counters on conventional Web pages, but preferably is encrypted so that valid codes can not readily be discerned.

One convenient way of providing codes to players is by adopting the codes printed on tickets from movies, concerts, raffles lotteries, and other events, air bills from overnight couriers, etc., all of which have a number associated with them along with other data such as which concert, raffle, lottery the ticket is for and when the event occurred or when the ticket was purchased. In the following example, a second chance to win a benefit using a lottery ticket is described in which the lottery numbers picked by the user constitute the validation code.

Example 3

As in many lotteries, there are periodic drawings in which a winning set of numbers are announced and any matching tickets can be redeemed for prizes ranging from one to millions of dollars. For each such drawing, players either pick a set of lottery numbers or have the vendor pick numbers for them. There are no restrictions on the number of lottery tickets that the player can purchase and the player's identity remains anonymous, at least until a major prize is claimed. Once the winning numbers are announced, losing tickets ordinarily have no value; however, the present invention provides players with a second chance to win a benefit using their set of lottery numbers.

Figure 20:
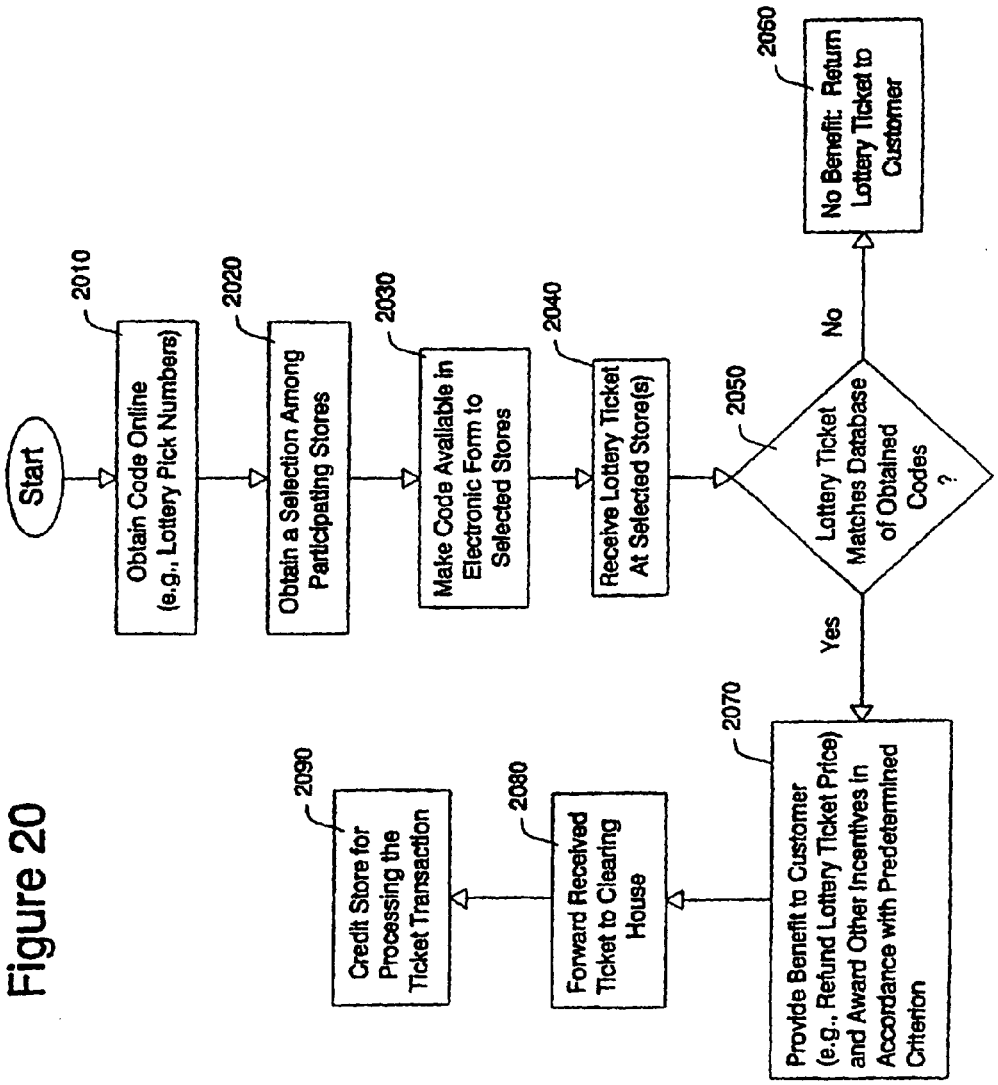
FIG. 20 is a flow chart in accordance with an embodiment of the invention in which the validation codes are supplied by players (e.g., from a lottery ticket)

With reference now to FIG. 20, a player enters his or her lottery pick numbers within a prescribed period after a drawing, using a redemption form as previously described. At step 2010, the lottery pick numbers are obtained at an online site. The online site can be hosted by a particular company, or, as in this example, by the lottery provider itself. Upon registering his or her lottery pick numbers online, the player is presented at step 2020 with a selection of participating stores. Any selections by the player are preferably recorded, though all of the participating stores can be automatically selected. On the other hand, if the second-chance game were hosted by a particular company, step 2020 is not required and the hosting company is automatically the "selected" store. In either case, the store selections are recorded and each such store can be charged a fee for having been selected. A further fee can be assessed if a player links to one of the selected store's Web sites.

The obtained code is made available to the selected store(s) at step 2030 for matching with the lottery ticket when the player visits the selected store(s). The codes are made available, for example, by downloading any entered codes to individual stores or a central server maintained by the store chain, or by providing a secure space from which the obtained codes can be accessed by individual stores or the store chain. Thus, as each set of the lottery pick numbers is obtained, it becomes a "registered" validation code. Preferably, the obtained codes for each selected store are arranged so as to define a (logically) distinct database of registered validation codes. In this manner, the same registered validation code can be stored once and associated with multiple stores through a physically common data store, or stored in each of several physically separate data stores.

After entering the code online, the player visits the selected store(s) and obtain benefits at such stores, or thereafter, if a lottery ticket is received (step 2040) at such store matches the lottery pick numbers that have been made available to that store. Preferably, the lottery ticket includes a machine-readable code or magnetic ink to facilitate receiving the lottery pick numbers at the store. The machine-readable code preferably includes data in addition to the lottery pick numbers for tracking and transaction-validation purposes. A fee can be assessed to the store for having driven the customer from the Internet to the store, either in the form of a flat fee or as a percentage of any sale made at the store (which readily can be tracked because the validation code is received at the point of sale during a purchase transaction).

The lottery pick numbers are compared to the database of obtained codes at step 2050; if there is no match then no benefit is provided to the customer and the lottery ticket is returned to the customer at step 2060. Otherwise, when there is a match, the customer is rewarded for having gone online, entered his or her lottery pick numbers, and shopped at a selected store. Thus, at step 2070, the customer may be refunded the cost of the lottery ticket (e.g., one dollar) upon presenting a lottery ticket with registered lottery pick numbers. The customer may be provided with further benefits to encourage a visit to the store's Web site, e.g., by distributing a code to the customer on a game card or receipt from that purchase transaction which can be entered online as described in sections A-E above, by having a second drawing for those players that entered their lottery pick numbers online, or by offering discounts and gifts for visiting stores that are geographically close to where the lottery ticket was purchased (a traceable factor). Such further benefits may take into account other predetermined criteria such as whether the store has excess inventory to sell, any specials that are in progress or planned, and the like.

Optionally, the received lottery ticket (or a data file generated by reading the ticket) can be forwarded to a clearinghouse at step 2080. The clearinghouse might be a state/national lottery commission or a lottery facilitator charged with the task of maintaining and processing lottery tickets for such state/national commissions. Thereafter, the store might enjoy a rebate at step 2090 for processing the lottery (or other) ticket transaction.

For other ticket types, there may not be a rebate of the ticket cost, but other benefits can be provided at step 2070 such as a discount on one or more purchases, special offers, online awards as described above.

Example 4

A player enters his or her lottery pick numbers at a designated Internet site using a redemption form as at step 2010 of Example 3. In accordance with a variation of the invention, prior to making the entered code available to any selected stores, the lottery pick numbers are tested for validity against the database of lottery pick numbers that were part of a particular drawing (e.g., the most recent drawing). Only if the code is valid will it be registered or voided at the designated Internet site. To achieve this comparison, the designated internet site includes a link to a data store of the lottery numbers that were picked for a given drawing.

The registered code can now be presented at any participating Internet site or dirt-world store to redeem a benefit such as a discount. In this arrangement, the user is presumed to have purchased a lottery ticket based on his or her knowledge of a valid code; even if the user provides a set of lottery pick numbers without having purchased the ticket, the participating Internet sites still benefit from this fraudulent act when that user makes a purchase at their sites. In other words, the "player" was directed to that site to make a purchase and so the marketing campaign was a success. In any event, the player may be required to present a lottery ticket bearing a registered validation code if the benefit is to be redeemed in a dirt-world store.

The method of this example applies to other enumerated ticket types (e.g., movie tickets).

The tickets that are supplied to vendors, whether for lottery or other event, may include the names and Web site addresses of those stores that are selectable at step 2020, that is, of the stores participating in the promotion. These names and addresses can be a reminder to the customer/player of which sponsoring stores are offering a "second chance" and may be printed or pre-printed onto the tickets (e.g., on the back). The code obtained at step 2010 can be obtained directly at one of the sites specified on the ticket and then made available at the stores associated with that site.

The invention has utility in environments other than fast food chains, clothing retailers, and commercial internet sites. The invention may be used to encourage customers to view information related to something he or she has experienced or to return to the theater or go to a designated store, as described in the following Examples.

A customer purchases a movie ticket having a visible validation code printed on it, as in FIGS. 9 and 11. The validation code from the ticket stub is entered at an internet site maintained by the theater, movie studio, or other sponsor. Upon registering the validation code in a redemption form as previously described, the customer may now view further information about the movie just seen or future movies or other information that is not available to the public unless they have earned e-points or have registered a validation code.

Example 6

A customer purchases a movie ticket as in the prior example, and enters the validation code from the ticket stub into a redemption form at a site on the internet. The validation code is voided by the act of registering it. The customer may now present the voided movie ticket stub at one or more designated theaters or stores for a benefit, e.g., a discount on a subsequent movie or other items. This benefit may be time restricted, that is, may require the customer to visit a dirt-world store within two weeks of either voiding the ticket stub or seeing the movie.

K. Indefinite Returns to Participating Internet Sites and Stores

The steps of obtaining a code at a designated Internet site and thereafter receiving the code at a dirt-world store or another Internet site can be repeated indefinitely.

Figure 21:
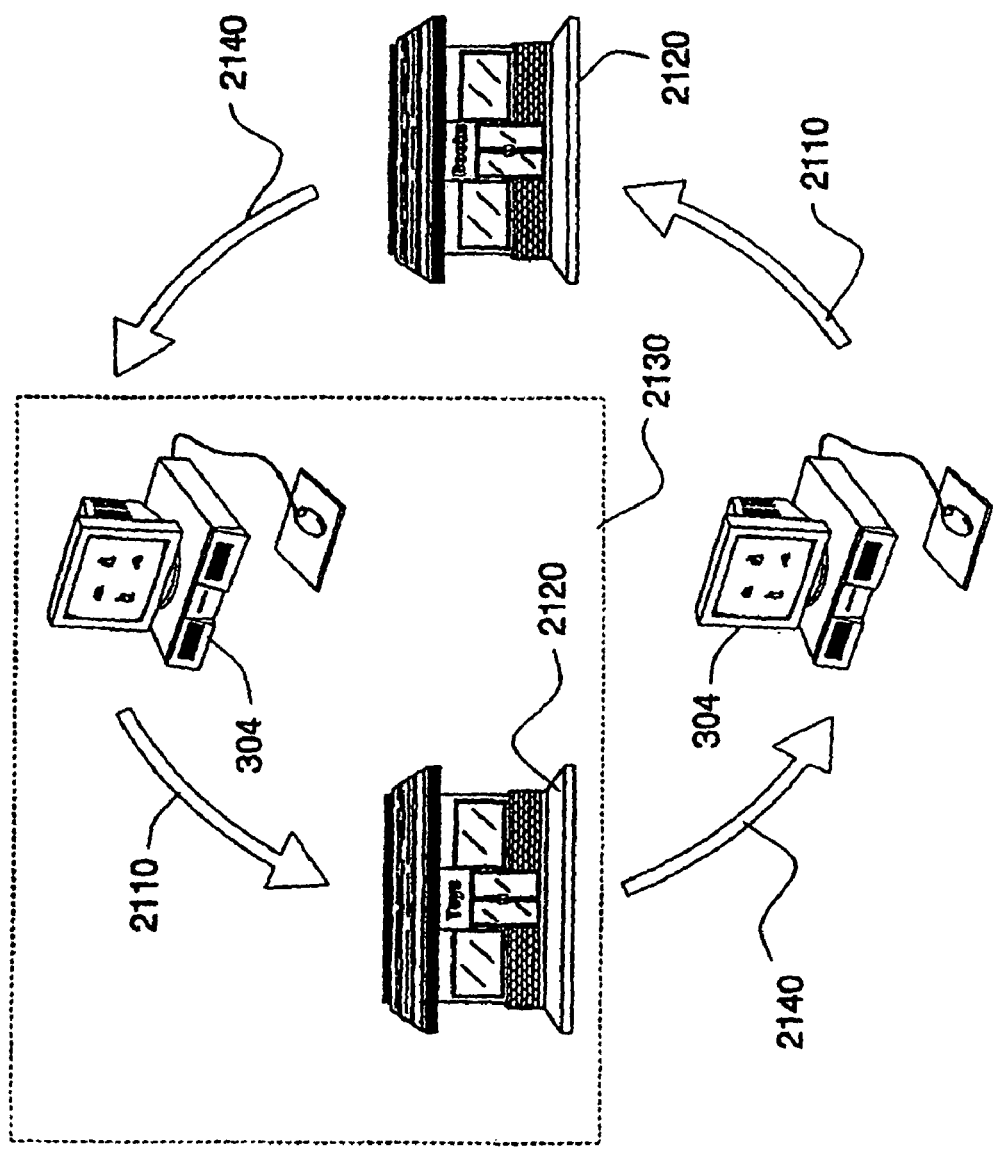
FIG. 21 depicts a repeated and desired cycle of consumer behavior enabled by the present invention.
Figure 22:
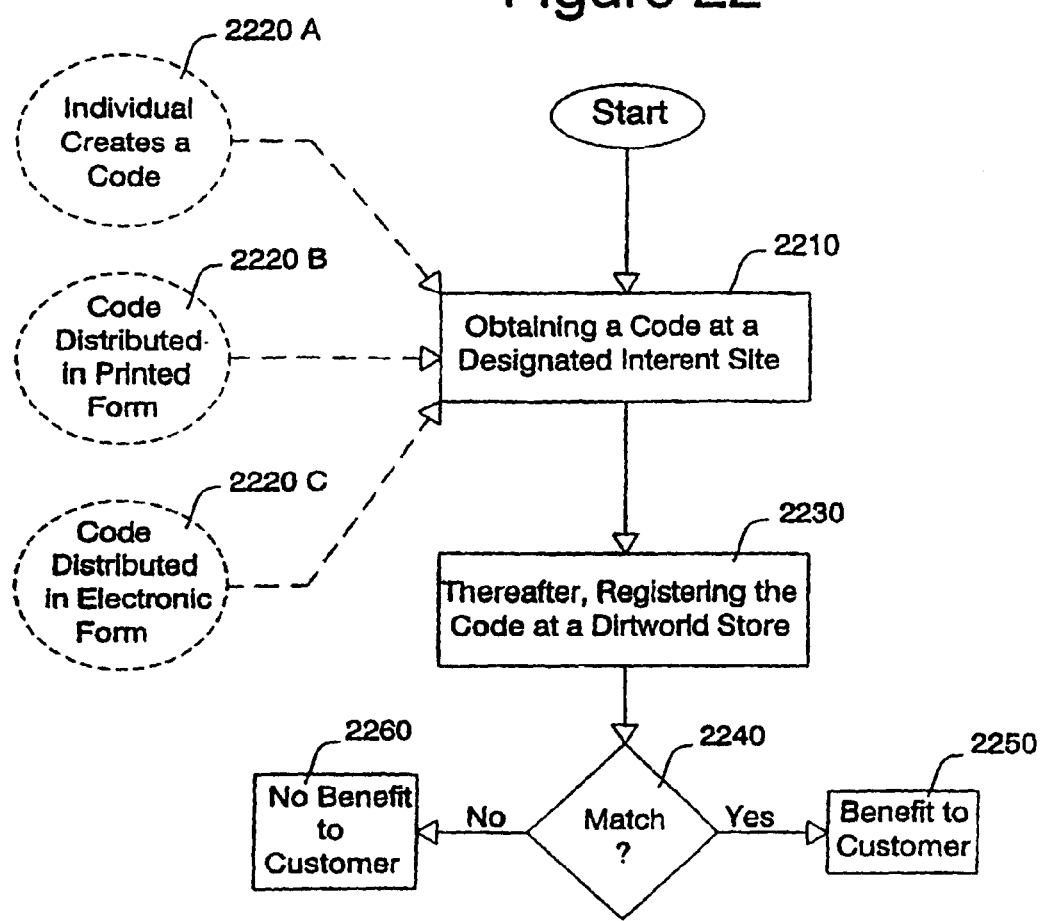
FIG. 22 is a flow chart consistent with the cycle of FIG. 21.

With reference now to FIGS. 21 and 22, a code is obtained at a designated internet site at step 2210 through a customer's machine 304 connected to the Internet 306. The customer either creates the code (step 2220A; e.g., by entering a made-up code such as a password, lottery pick numbers, etc.), or has the code distributed to him or her in a printed form (step 2220B; e.g., game card, FSI, receipt, etc.) or an electronic form (step 2220C; e.g., by e-mail, banner, etc.).

The customer thereafter goes to a store as illustrated by the arrow 2110. At the store (e.g., a dirt world store such as the store 2120), the customer provides the code to a clerk at a point-of-sale terminal, as indicated at step 2230. If there is a match, as determined at step 2240, a benefit is provided to the customer (step 2250). If there is no match, no benefit is provided (step 2260). These acts comprise the fundamental building block 2130 of repeated and desired customer behavior. These acts can be repeated with the customer going back online, as indicated by the arrow 2140, entering the code at the machine 304, going back to the store 2110, and making a purchase at the store 2120 (which can be the same store or a different store, depending on the promotion).

Example 7

Figure 23:
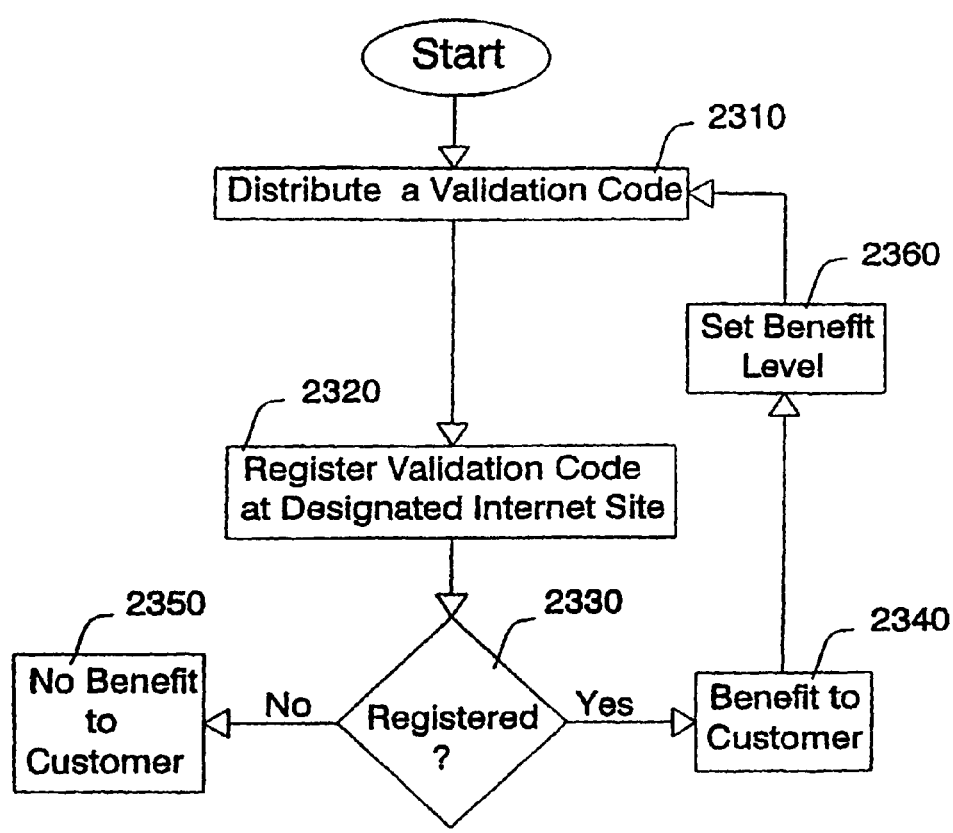
FIG. 23 is a flow chart of an embodiment in which benefits are provided to customers at either dirt-world stores or Internet sites.

Turning now to FIG. 23, a method in accordance with another aspect of the invention provides benefits to customers at either dirt-world stores or Internet sites. At step 2310, a validation code is distributed to the user in any of the manners described above, such as from a receipt from a purchase transaction, a game card, or through a banner ad displayed on a Web page of a Web site. The validation code is registered at a designated Internet site at step 2320. In the event that the code is provided to the customer in electronic form (e.g., from a banner ad), then registration is achieved by first linking to the site addressed in the banner ad and then linking to a specified further Internet site.

The user next navigates to a participating Internet site or dirt-world store and, if the code is presented, it will be tested to see if it was registered, at step 2330. If the code was registered, a benefit is provided at step 2340. If the code was not registered, no benefit is provided at step 2350. At the conclusion of the transaction the user is provided with another code and will receive the same or an increased benefit if the cycle is repeated, that is, by looping back to the code distribution step 2310.

Optionally, the benefit level provided to the customer can be adjusted to reward frequent shopping or desired customer behavior. On the contrary, if the customer tapers the frequency of the desired behavior, the benefit level may be adjusted downwardly. Thus, at step 2360, the benefit level provided to the customer is set and the setting can be stored in a database 300 (e.g., a Relationship Table as described above).

The repeating cycle is somewhat facilitated if the selection of stores participating in the game or lottery include stores within a prescribed range of where the code was distributed. Because the source of the code can be identified (specific codes are distributed to known stores, known stores generate known codes, or the source of a ticket can be traced back to the vendor), the selection of dirt-world stores to visit can be dynamically determined and displayed to the individual at the designated Internet site. Of course, if the promotion is geared to encourage online sales, geographic proximity is not an issue.

L. Coordination of Distributed Codes with Purchased Items

When a code is distributed to a customer in a retail store, it can be associated with the items that were scanned at the point-of-sale terminal. This association can be made by assigning a code at the point of sale and storing that code along with the items purchased in a database (e.g., database 300), or when a pre-printed game card is distributed, by scanning a machine-readable code on the game card and storing that code along with the items purchased in a database. If the code is registered or voided online, market data is gathered concerning the individual who registered the code without his or her identity being divulged. The market data indicates the percentage of purchasers of particular goods and services who were motivated to go online and register their validation codes in view of the advertised or promoted incentives. The data also indicates the percentage of such purchasers who did not go online to register their codes. Further, data can be gathered and accumulated concerning any registered validation codes that are presented at a point-of-sale, and the newly purchased items and next validation code can be again recorded and linked to the data file concerning the purchasing habits of that individual. Although the individual's identity may not be known, data is nevertheless gathered concerning the frequency of which specific (unknown) individuals purchase particular items as well as other items.

M. Description of the Code Processing Feature

The code-processing feature is preferably implemented on a secure server so that the winning codes are not available for inspection. Codes are entered at a designated Internet site using a redemption form as described above. The redemption form can be implemented using HTML tags, preferably with javascript routines running at the individual's (client-side) browser so that the form is only posted to the code-processing server after a complete code (and any other required data) has been entered.

For example, the code entries 804 in the redemption form of FIG. 8 can be implemented as a single row table within a form that is posted to a server for code-processing, as shown in the following pseudocode:

```
<form name=form1
    action="http://consumerdigital.com/cgi-bin/mainpage.htm"
    method="post"
    onsubmit="return done( ); ">
    <table><tr>
        <td><IMG src="graphics/question.gif" name="A"></td> ***
        <td><IMG src="graphics/question.gif" name="F"></td>
    </t.>
    </table>
    <input type=hidden name="ResponsePage"
    value="http://www.consumerdigital.com/prizepg.htm">
    <input type=hidden name="code" value="null">
    <input type=submit value="Submit">
    <input type=reset value="Clear" onclick="restart( );"> </H4>
</form>
```

All of the code entries 804 in the redemption form of FIG. 8 initially are set to display a wildcard image in their respective cells "A" through "F", such as a question mark (see code entry 804-3). This form, Form1," includes two visible input fields (clear 806 and submit 808) and two hidden fields (response page and code). The visible fields are displayed on the customer's Web browser at the machine 304. The hidden fields are not displayed. The "response page" field defines the address of the next page to display after the customer posts the form (by pressing the submit button 808). The "code" field stores as its value the code that is entered by the customer, and initially has a value "null."

As the icons 802 are selected by the user, the image of the wildcard is swapped for the image of the selected icon and each code entry is tracked for later posting once complete. This can be implemented using a suitable event handler, provided that the customer uses a Web browser which handles images as objects, such as Netscape Communicator 4.0 or higher or Microsoft Internet Explorer 4.0 or higher. These browsers permit the source attribute of the singleton image tag to be dynamically modified, and thereby permit the image to be swapped on the Web browser screen without the need for reloading the current page—which would be one alternative approach to displaying the user's selections on the display of the station 304. The update1con function shown in pseudocode below is one suitable event handler for (1) swapping icons 802 for code entries 804 and (2) populating a one-dimensional inputCode array which enables the input validation code to be posted to the code processor:

```
function updateIcon(currentIcon,codeEntry,codeValue) {
    if(currenticon=0)document.A.src˜codeEntry;
    if(currenticon=1 )document.B.src=codeEntry;
    if(currenticon=2)document. C. src=codeEntry;
    if(currenticon˜3)document.D.src˜codeEntry;
    if(currentIcon=4)document.E.src˜codeEntry;
    if(currenticon˜5 )document.F. src˜codeEntry;
    inputCode[currenticon] = codeValue;
}
```

The parameters passed to the update1con function are:

currenticon: a variable which is indexed with each icon selection by the customer, e.g., from 0 to 5 for a six-icon code.

codeEntry Sx: the name of or a variable identifying a specific icon 802.

codeValue X: an arbitrarily value assigned to the selected icon 802 and used by the system for determining whether the set of selected icons entered by the user correspond to a valid validation code.

As each icon 802 is selected by an individual as a code entry 804, the update1con routine can be used to process the event. The update1con function can be used in an event handler responsive to an onclick event as in the following statement which responds to the selection of the icon 802-3:

| onclick= | "update}con(currenticon,'graphics/fries.gif,3); currenticon=++currenticon;" |

The value of the indexed variable currenticon is used to dynamically modify the source attribute of one of the cells "A" through "F" in the Form1 to have the value of the parameter "codeEntry" that is passed with the function call. For example, in the above statement, the variable codeEntry is assigned the image "graphics/fries.gif." The value of the current1con variable is indexed with each icon selection, from an initial value zero to six (due to the postfix notation), for a six-icon code as shown in FIG. 8. The values of the codeEntry and codeValue parameters are established with respect to each icon 802-*x*, and the value passed to the update1con function depends on which icon 802 was selected.

The icons 802 are preferably arranged in a two-row table using standard HTML tags. with an event handler responding to the user's icon selections. For example, a validation code is entered by a customer by click-selecting on the various selectable-links (icons 802). The following pseudocode includes an event handler which responds to a mouse click over icons 802-1 and 802-2; however, the entire set of icons 802 can be handled in the same manner, with the event handler preferably managing the details of which icon was selected:

```
<table>
<td><a href="#S 1" onclick="eventHandlerO;"><IMG
                    src="graphics/coffee.gif"></a></td>
<td><a href="#S2" onclick="eventHandler( );"><IMG
                    src="graphics/icecream.gif"></a></td>
</table>
```

A preferred event handler for "eventHandlerO" is the date1con function described above.

Referring again to the Form1, the visible input fields, clear and submit, each include an event handler. The clear button 806 responds to an onclick event by invoking the function restart( ), which causes the code entries 804 to be reset to their initial wildcard images, and also resets the indexed variable currenticon. The restart( ) function can be implemented as a javascript routine as in the following pseudocode:

```
function restart( ) {
    currenticon=O;
    document.A.    src=wildC     ard;
    document.B    .    src=wildCard;
    document.C. src=wildCard;
    document.D.src=wildCard;
    document.E.            src=wildCard;
    document.F.src=wildCard;
}
```

The variables currenticon and wildCard are global variables. The variable wildCard can be defined as follows:
  var wildCard='graphics/question.gif');

The submit button 808 responds to an onsubmit event by invoking the handling routine "return done( )." When the customer attempts to submit an input validation code, a test is made to determine whether the customer has entered a complete code. If the code is incomplete, the event handler will ignore the submit request and wait for the customer enter a complete code (here, six icons in a row, code entries 804-1 through 804-6). Once a complete code has been entered, the code is posted to the address specified in the action field, which in this example is "http://consumerdigital.com/cgi-bin/mainpage.htm." This event handler is represented in pseudocode as follows:

```
function done( ) {if (currenticon<6) return false;}
```

The done event handler returns the value "false" until the variable currenticon has been indexed to 6 (that is, until six codes entries 804 have been instantiated). After a complete code has been entered, the done routine will return the value "true" and the submit request will be processed by posting the inputCode array to whatever code-processing server is designated in the action field of Form1.

The actual testing of the code entered by the customer is preferably done at a secure, remote server which has access to all of the valid codes and can test the sublitted code for a match to stored codes. Briefly, as a result of the user's interaction with the icons 802 and entry of code entries 804-1 through 804-6, the inputCode array is instantiated to have values representative of the code entries. The inputCode array can be tested, element by element, against the set of valid codes to determine (1) whether there is a match, and/or (2) whether the input code is already void. The contents of the inputCode array can be transferred to the hidden field "code" of Form1 by a suitable function such as the javascript pseudocode shown below:

```
function updateCodeToPost(inputCode) {
    document.form1.code.value=inputCode[0] +
        inputCode[1] + inputCode[2] + inputCode[3] + InputCode[4] +
        InputCode[5];
)
```

This javascript routine can be executed, for example, from the update1con routine, when the variable currenticon has reached a predetermined value (e.g., "5"), and causes the value of the "code" field in Form1 to be updated from "null" or some other initial setting to the code input by the customer at his or her machine 304.

N. Codes Distributed Over Time or Several Locations

In a variation of the foregoing, the validation code is distributed over time or across several locations.

For example, a code can be distributed over time in the form of an order of advertisements on a television station or "bugs" which appear on the television display (typically appearing briefly as an overlay in a corner, and typically being translucent). Assume, for example, that during prime-time there are four half hour shows (shows 1, 2, 3, and 4) and one one-hour show (show 5) with commercials appearing before, during and after each show in the following order {1A, 1B, 1C, 1D, 1E, 2F, 2G, 2H, 2I, 3J, 3K, 3L, 3M, 4N, 40, 4P, 4Q, 5R, 5S, 5T, 5U, 5V, 5W, 5X, 5Y, and 5Z}, where letters represent advertisements and numbers represent the shows. A "winning" code includes one advertisement during each of these shows, for example, and many such winning codes can be derived. Accordingly, a player can be rewarded with a benefit by entering a code such as {A, F, J, N, R} or {D, I, M, Q, Z} from a selection of icons representative of each advertiser, by typing in the name of the advertiser or product, or by otherwise establishing that he or she saw the commercials on that television station during prime-time. If the player attempted to guess, he or she will quickly discover that there are far more losing permutations than winning ones. The prize can be a discount at the Web sites of any of the advertisers, or an online reward at the Web site of the television station, for example. As a result of this method, advertisers can gain important marketing information and television stations can gauge the viewership of an ad and charge advertisers for the viewing volume indicated by the number of codes registered online (or attempted to be registered).

In the case of bugs, the bugs can indicate (in addition to or instead of their typical function as a station ID) a product being promoted and/or a code element (like icons 802).

Similarly, the validation codes can be distributed across several locations. For example, a customer can enter at a designated internet site the order of advertisers in a particular magazine, or across several magazines or issues, in order to register a code and obtain a benefit.

O. Point of Sale Code Processing

When a validation code is received at a point of sale (POS) machine, for example, at a retail store or at an Internet site, the received validation code must be compared to the database of registered validation codes. During the purchase transaction a validation code is received from the customer at the POS machine as shown at step 2410 of FIG. 24. The POS machine may be an electronic cash register or an e-commerce backend processor at an Internet site. The received validation code is then compared to previously registered validation codes at step 2420. The previously registered validation codes can be made available, for example, from the database 300. An "award discount" discount signal is thereafter generated in response to the comparison, the discount signal awarding the customer a discount if the customer has already registered the validation code at a designated Internet site, at step 2430. Otherwise, a "no discount" discount signal will be generated, at step 2440. Depending on whether the customer has complied with the online-registration requirement, his or her purchase transaction will or will not be discounted when the purchase transaction is completed at step 2450. Completion of the purchase transaction comprises tallying the purchases, applying any tax, awarding any discounts and receiving the resulting total amount of money due from the customer. These steps can occur at a dirt-world store or at an e-commerce enabled Internet site.

P. Sources of Revenue

There are a variety of sources of revenue associated with one or more aspects of the present invention. A fee can be assessed for each code that is distributed. A distinct revenue-generating event can be the registration or voiding of a code online. Further along in the cycle, a fee can be assessed for tendering/entering a registered code at a point of sale or as a percentage of the net sale or profit (e.g., 5% of the net sale). A paid-up or monthly fee can be assessed for indirect access to a host-operated code-processing server, or for including the code-processing technology at a corporate Web server.

In addition, a participation fee can be assessed to third-party prize providers for the promotional value of their association with the game host and the presentation to individuals/players on the Internet or other distributed network. Similarly, cross-marketing arrangements between multiple stores which accept common series of codes can be an additional source of revenue.

Finally, a portion of advertising revenue from the Web sites of participating stores and Internet sites can be assessed to the game provider, for example, if an individual/player is driven to such Web site through the act of entering a validation code.

The machine 304 at which the validation codes are received can be a computer or television configured for two-way communication (e.g., a television which is connected to a telephone line or two-way communication cable line or fiber optic link) or other interactive device which has both input and output devices connected to convey information to and from an internet site. Exemplary input devices include a mouse, joystick, keyboard, remote control, touch screen switch panel, acoustic-wave interference-sensing switch panel, and microphone. Exemplary output devices include a CRT, LCD, plasma display, and loudspeaker. One or more of these input and output devices can be included in the machine 304. After entering the validation code(s) into the machine, the player is awarded a number of e-points as previously described.

It should be understood that an arbitrary number of alphanumeric characters can be used for the validation code on a game card or receipt. The master code 106, for example, may comprise seven alphanumeric characters selected from A-Z and 0-9, which provides 78,364,164,096 possible master codes (i.e, unique game cards). Tf lower-case alphabetic characters are also used, then the seven characters provide 3,521,614,606,208 (3.5+ trillion) unique game cards. The sub-code 108 need only be one number or character to permit the customer to make a selection. However, to minimize fraudulent redemption, it is preferred that the same sub-codes not appear on every card and that multi-character sub-codes be used as shown on game-card 100 (note that three case-sensitive alphanumeric characters provide 238,000+ unique sub-codes). When a seven character master-code and three character sub-code are used in a case-sensitive system, 3.5 trillion game-cards can be printed, with over 839 quadrillion assignable codes. As noted above, a single validation code can be used in lieu of separate master-codes and sub-codes. Depending on the implementation, a single code may not be as user-friendly to enter, but will greatly increase the number of combinations for the same total number of alphanumeric characters or icons being used.

When the validation code is not pre-printed and is instead to be printed on a register receipt, the validation code can be dynamically generated in real-time, as described in U.S. Pat. No. 5,892,827 of Beach et al., the disclosure of which is hereby incorporated by reference as if set forth in its entirety herein. The system of the '827 patent provides an alternative technique to ensuring that each customer is provided with an unique validation code that can be used to redeem an award.

As used herein, the term "game card" is intended to broadly refer to any medium which can display the validation codes, and includes printed as well as "virtual" game cards that may be displayed on a display screen such as a CRT, LCD or plasma display. Printed cards may be distributed at dirt-world stores whereas virtual cards are distributed at internet sites. Game cards can be given away or sold to the player. A "store" at which a game card (or more particularly, a "virtual" game card) may be distributed includes internet sites, within the meaning of the present specification, and the game card can be tendered to such a "store" by accessing that internet site at a time after the game card has been voided, for example, after browsing one or more game-sponsor designated sites at which the a redemption form is provided for registering the validation code.

As used herein, a "selectable-link" is a graphical or textual element displayed in a first Web page which causes a Web browser to address another Web page when a mouse is positioned over the element and the mouse-button is pressed. The selectable-link includes among other possible links: anchored text as in the HTML expression "<a href="consumerdigital.com">Click Here To Submit Validation Code</a>;" anchored images as in the HTML expression "<A><IMG src="graphics/question.gif"></A>;" or an area in a client-or server-side image map. The manner by which the selectable-link is implemented is not material to the invention.

As used herein, a "partner" site is the Web site of another company or division that is participating in the same game either as a prize granter or a prize source.

While the invention has been described in detail with particular reference to certain embodiments thereof, the invention is capable of different embodiments and its details are capable of modifications in various obvious respects. As would be readily apparent to those skilled in the art, variations and modifications can be affected while remaining within the spirit and scope of the invention. For example, the validation codes may be "distributed" aurally, e.g., by a radio announcer, so that the players/listeners have to jot down the code on a piece of paper or memorize it until such time that they enter the validation code into a redemption form, as previously described. Accordingly, the foregoing disclosure, description, and Figures are for illustrative purposes only, and do not in any way limit the invention, which is defined only by the claims.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A method for encouraging a lottery ticket holder who has purchased the lottery ticket to access a designated Internet site, comprising the steps of:
   (a) inputting at an Internet site information visibly supported on the lottery ticket of a given drawing to register the lottery ticket, the input information including picked lottery numbers of the lottery ticket holder;
   (b) testing the input information to determine if it matches lottery numbers that were picked for the given drawing; and
   (c) providing access to the designated Internet site on the condition that the test indicates that the information visibly supported on the lottery ticket satisfied the test.

2. The method as in claim 1, wherein the information is a set of numbers printed on the lottery ticket.

3. The method as in claim 2, wherein the lottery ticket includes picked numbers and wherein the set of numbers comprises at least a portion of the picked numbers.

4. The method as in claim 3, wherein the lottery ticket further includes a scratch-off type instant win game, the method including the additional step of selectively providing the lottery ticket holder with an award in response to play of the scratch-off game.

5. The method as in claim 4, wherein the lottery ticket includes a URL of the designated Internet site, the method including the additional step of informing the lottery ticket holder of the address of the designated Internet site.

6. The method as in claim 1, including the additional steps of:
   d) conducting a second lottery drawing;
   e) selecting as a winner of the second lottery drawing one lottery ticket having information that was registered at the designated Internet site; and
   f) awarding a prize to the lottery ticket holder possessing the lottery ticket, whereby only lottery ticket holders that have registered information at the designated Internet site are eligible to be selected for the prize.

7. The method as in claim 6, including the additional steps of providing the prize at a store and assessing a fee to the store for driving the lottery ticket holder to the store.

8. The method as in claim 1, including the additional step of tracing the location where the lottery ticket was purchased, and wherein the providing step further provides one of discounts and gifts to the lottery ticket holder for visiting stores that are geographically close to where the lottery ticket was purchased.

9. The method as in claim 1, including the additional steps of:
   presenting the lottery ticket holder with a selection of participating stores; recording any store selections made by the lottery ticket holder; and
   charging a fee to at least one of the selected stores for its selection by the lottery ticket holder.

10. The method as in claim 1, wherein the providing step includes presenting the lottery ticket holder with a selection of participating stores, wherein said access to the designated Internet site comprises a link to the Web site of a participating store presented for selection, and wherein a fee is assessed if the lottery ticket holder links to said Web site.

11. A computer program product comprising a non-transitory computer useable medium having computer program logic recorded thereon that, when executed, enables control of access to a designated Internet site by a lottery ticket holder who has purchased the lottery ticket, by:
   enabling an Internet site to receive information visibly supported on the lottery ticket of a given drawing to register the lottery ticket, the input information including picked lottery numbers of the lottery ticket holder;
   testing the input information to determine if the input information includes picked lottery numbers that match lottery numbers that were picked for the given drawing; and
   providing access to the designated Internet site on the condition that the test indicates that the information visibly supported on the lottery ticket satisfied the test.

12. The computer program product according to claim 11, wherein the information is a set of numbers printed on the lottery ticket.

13. The computer program product according to claim 12, wherein the lottery ticket includes picked numbers and wherein the set of numbers comprises at least a portion of the picked numbers.

14. The computer program product according to claim 13, wherein the lottery ticket further includes a scratch-off type instant win game, and wherein the computer program product further comprises:
   selectively providing the lottery ticket holder with an award in response to play of the scratch-off game.

15. The computer program product according to claim 14, wherein the lottery ticket includes a URL of the designated Internet site, and wherein the computer program product further comprises:
   informing the lottery ticket holder of the address of the designated Internet site.

16. The computer program product according to claim 11, further comprising:
   selecting as a winner of a second lottery drawing one lottery ticket having information that was registered at the designated Internet site; and
   awarding a prize to the lottery ticket holder possessing the lottery ticket, wherein only lottery ticket holders that have registered information at the designated Internet site are eligible to be selected for the prize.

17. The computer program product according to claim 11, further comprising:
   tracing the location where the lottery ticket was purchased, and
   providing one of discounts and gifts to the lottery ticket holder for visiting stores that are geographically close to where the lottery ticket was purchased.

18. The computer program product according to claim 11, further comprising:
   presenting the lottery ticket holder with a selection of stores;
   recording any store selections made by the lottery ticket holder; and
   charging a fee to at least one of the selected stores for its selection by the lottery ticket holder.

19. The computer program product according to claim 11, wherein said access to the designated Internet site comprises a link to the Web site of a store presented for selection, and further comprising:
   presenting the lottery ticket holder with a selection of stores; and;
   assessing a fee if the lottery ticket holder links to said Web site.

20. A system for enabling control of access to a designated Internet site by a lottery ticket holder who has purchased the lottery ticket, comprising:
- a component configured to receive as input at an Internet site information visibly supported on the lottery ticket of a given drawing to register the lottery ticket, the input information including picked lottery numbers of the lottery ticket holder;
- a component configured to test the input information to determine if the input information includes picked lottery numbers that match lottery numbers that were picked for the given drawing; and
- a component configured to provide access to the designated Internet site on the condition that the test indicates that the information visibly supported on the lottery ticket satisfied the test.

21. The system according to claim 20, wherein the information is a set of numbers printed on the lottery ticket.

22. The system according to claim 21, wherein the lottery ticket includes picked numbers and wherein the set of numbers comprises at least a portion of the picked numbers.

23. The system according to claim 21, wherein the lottery ticket further includes a scratch-off type instant win game, further comprising:
- a component configured to selectively provide the lottery ticket holder with an award in response to play of the scratch-off game.

24. The system according to claim 23, wherein the lottery ticket includes a URL of the designated Internet site, further comprising
- a component configured to provide the address of the designated Internet site.

25. The system according to claim 20, further comprising:
- a component configured to select as a winner of a second lottery drawing one lottery ticket having information that was registered at the designated Internet site; and
- a component configured to award a prize to the lottery ticket holder possessing the lottery ticket, wherein only lottery ticket holders that have registered information at the designated Internet site are eligible to be selected for the prize.

26. The system according to claim 20, further comprising:
- a component configured to trace the location where the lottery ticket was purchased; and
- a component configured to provide one of discounts and gifts for visiting stores that are geographically close to where the lottery ticket was purchased.

27. The system according to claim 20, further comprising:
- a component configured to present a selection of stores;
- a component configured to record any store selections made by the lottery ticket holder; and
- a component configured to charge a fee to at least one of the selected stores for its selection by the lottery ticket holder.

28. The system according to claim 20, wherein said access to the designated Internet site comprises a link to the Web site of a store presented for selection, further comprising:
- a component configured to present the lottery ticket holder with a selection of stores; and;
- a component configured to assess a fee if the lottery ticket holder links to said Web site.

* * * * *

UNITED STATES PATENT AND TRADEMARK OFFICE
CERTIFICATE OF CORRECTION

| | |
|---|---|
| PATENT NO. | : 8,140,385 B2 |
| APPLICATION NO. | : 11/513324 |
| DATED | : March 20, 2012 |
| INVENTOR(S) | : Leason et al. |

It is certified that error appears in the above-identified patent and that said Letters Patent is hereby corrected as shown below:

In Fig. 22, Sheet 22 of 24, for Tag "2210", in Line 2, delete "Interent" and insert -- Internet --, therefor.

Figure 24:
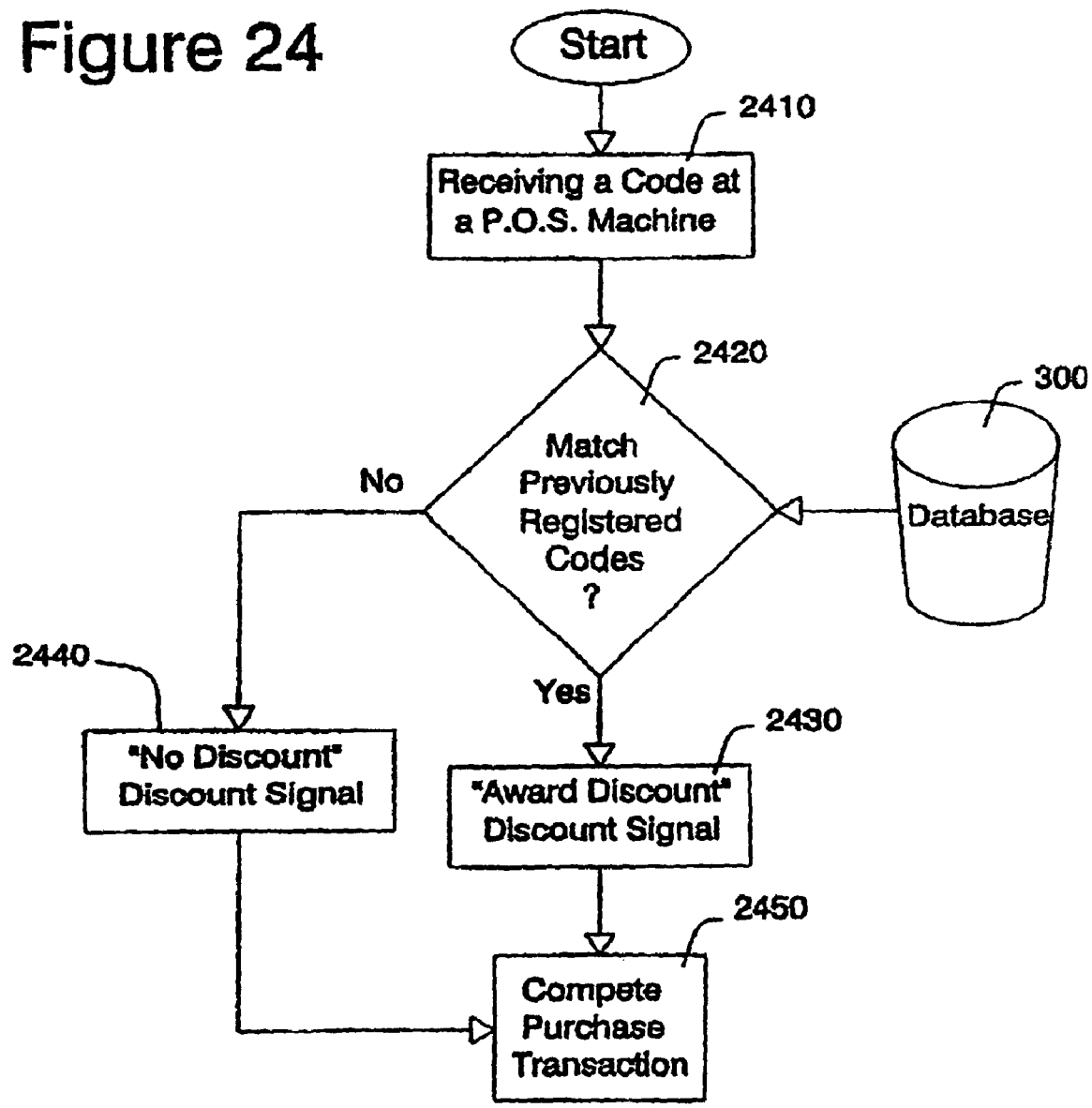
FIG. 24 is a flow chart of a point of sale machine for processing validation codes.

In Fig. 24, Sheet 24 of 24, for Tag "2450", in Line 1, delete "Compete" and insert -- Complete --, therefor.

In Column 2, Line 66, delete "drawing Figures" and insert -- drawings/Figures --, therefor.

In Column 12, Lines 27-29, delete "section....e-points." and insert the same at Line 26, after "present", as a continuation of the paragraph.

In Column 22, Line 55, delete "current1con" and insert -- currentIcon --, therefor.

In Column 22, Line 63, delete "tags. with" and insert -- tags with --, therefor.

In Column 23, Line 36, delete "gif');" and insert -- gif'; --, therefor.

In Column 24, Line 13, in Table, delete ")" and insert -- } --, therefor.

In Column 25, Line 62, delete "(i.e," and insert -- (i.e., --, therefor.

In Column 25, Line 62, delete "Tf" and insert -- If --, therefor.

Signed and Sealed this
Second Day of October, 2012

David J. Kappos
*Director of the United States Patent and Trademark Office*